US 8,845,337 B1

(12) United States Patent
Hu et al.

(10) Patent No.: US 8,845,337 B1
(45) Date of Patent: Sep. 30, 2014

(54) SHARING DEMONSTRATION INFORMATION BY A NETWORK CONNECTED DEMONSTRATION DEVICE AND SYSTEM

(75) Inventors: Luhui Hu, Bothell, WA (US); Jonathan A. Leblang, Menlo Park, CA (US)

(73) Assignee: Amazon Technologies, Inc., Reno, NV (US)

(*) Notice: Subject to any disclaimer, the term of this patent is extended or adjusted under 35 U.S.C. 154(b) by 41 days.

(21) Appl. No.: 13/166,731

(22) Filed: Jun. 22, 2011

(51) Int. Cl.
G09B 25/00 (2006.01)

(52) U.S. Cl.
USPC .......................................... 434/379; 434/365

(58) Field of Classification Search
USPC .................................. 434/365, 379; 715/705
See application file for complete search history.

(56) References Cited

U.S. PATENT DOCUMENTS

| | | | |
|---|---|---|---|
| 6,331,855 B1 * | 12/2001 | Schauser | 345/502 |
| 7,093,113 B2 * | 8/2006 | Lakshman | 713/1 |
| 7,424,543 B2 | 9/2008 | Rice, III | |
| 7,920,851 B2 | 4/2011 | Moshir et al. | |
| 2006/0048236 A1 | 3/2006 | Multerer et al. | |
| 2007/0097255 A1 | 5/2007 | Dalton et al. | |
| 2008/0028416 A1 * | 1/2008 | Gill et al. | 719/311 |
| 2008/0100695 A1 * | 5/2008 | Ebrom et al. | 348/14.08 |
| 2009/0030774 A1 * | 1/2009 | Rothschild et al. | 705/10 |
| 2009/0037287 A1 * | 2/2009 | Baitalmal et al. | 705/26 |
| 2009/0300190 A1 | 12/2009 | Williamson et al. | |
| 2010/0017501 A1 | 1/2010 | Yen | |
| 2010/0217884 A2 * | 8/2010 | Chaney et al. | 709/231 |
| 2011/0029363 A1 | 2/2011 | Gillenson et al. | |
| 2012/0069131 A1 * | 3/2012 | Abelow | 348/14.01 |
| 2012/0131465 A1 * | 5/2012 | Telek et al. | 715/733 |
| 2012/0191784 A1 * | 7/2012 | Lee et al. | 709/205 |
| 2012/0204102 A1 * | 8/2012 | Gwin et al. | 715/253 |
| 2012/0209586 A1 * | 8/2012 | Mieritz et al. | 703/22 |

FOREIGN PATENT DOCUMENTS

JP 2002074086 A * 3/2002

OTHER PUBLICATIONS

Baldurk "The History of the Let's Play Archive". Retrieved Nov. 18, 2013 from <url:lparchive.org/history>.*
USPTO Office Action for U.S. Appl. No. 13/166,736 mailed Feb. 6, 2013.
Flagship Studios, e-mail message to Peter Alley, "Hellgate for the Holidays". Dec. 18, 2007. Retrieved Jan. 24, 2013 from <URL:gmail.com>.

(Continued)

Primary Examiner — Sam Yao
Assistant Examiner — Peter J Alley
(74) Attorney, Agent, or Firm — Lowenstein Sandler LLP

(57) ABSTRACT

A demonstration device provides a demonstration session for an interactive demonstration. The demonstration device receives a request to share the interactive demonstration along with an identification of at least one of a social network account, an email address or a network location from the user by the demonstration device. The demonstration device shares the interactive demonstration by causing a link to the interactive demonstration to be sent to at least one of the social network account, the email address or the network location.

32 Claims, 13 Drawing Sheets

(56) References Cited

OTHER PUBLICATIONS

Krike. "Update notification—PHP Scripts—CodeCanyon". Sep. 19, 2010. Retrieved from the internet Jan. 25, 2013 from <URL:http://web.archive.org/web/20100919144854/http://codecanyon.net/item/update-notification/124763>.

USPTO Office Action for U.S. Appl. No. 13/166,736 mailed Aug. 27, 2013.

"Fully interactive virtual handsets for mobile operators. Anytime. Anywhere." Mobile Complete. Oct. 25, 2010. Retrieved Aug. 19, 2013 from <URL:http://www.demoanywhere.com/pdf/DemoAnywhere.pdf>.

* cited by examiner

SHARING DEMONSTRATION INFORMATION BY A NETWORK CONNECTED DEMONSTRATION DEVICE AND SYSTEM

RELATED APPLICATIONS

This application is hereby cross-referenced to U.S. patent application Ser. No. 13/166,736, filed on Jun. 22, 2011, which is assigned to the same assignee as the present application.

TECHNICAL FIELD

This disclosure relates to the field of demonstration devices and, in particular, to an interactive demonstration device that is connected to an online demonstration system.

BACKGROUND

To exhibit features and functionality of consumer devices, manufacturers often produce specialized demonstration (demo) devices that are displayed at brick and mortar retail stores. These demo devices may include the same hardware components as the associated consumer devices, but have different firmware or software. Alternatively, these demo devices may have different hardware components from their associated consumer devices. Typical demonstration devices are standalone devices that lack connectivity to any external devices or systems. This can impair an ability of the demo device to provide a demonstration experience that is truly representative of an experience that a user would have using the associated consumer device. Additionally, typical demonstration devices are not part of or connected to an online demonstration environment.

BRIEF DESCRIPTION OF THE DRAWINGS

The present disclosure is illustrated by way of example, and not by way of limitation, in the figures of the accompanying drawings.

DETAILED DESCRIPTION

Figure 1:
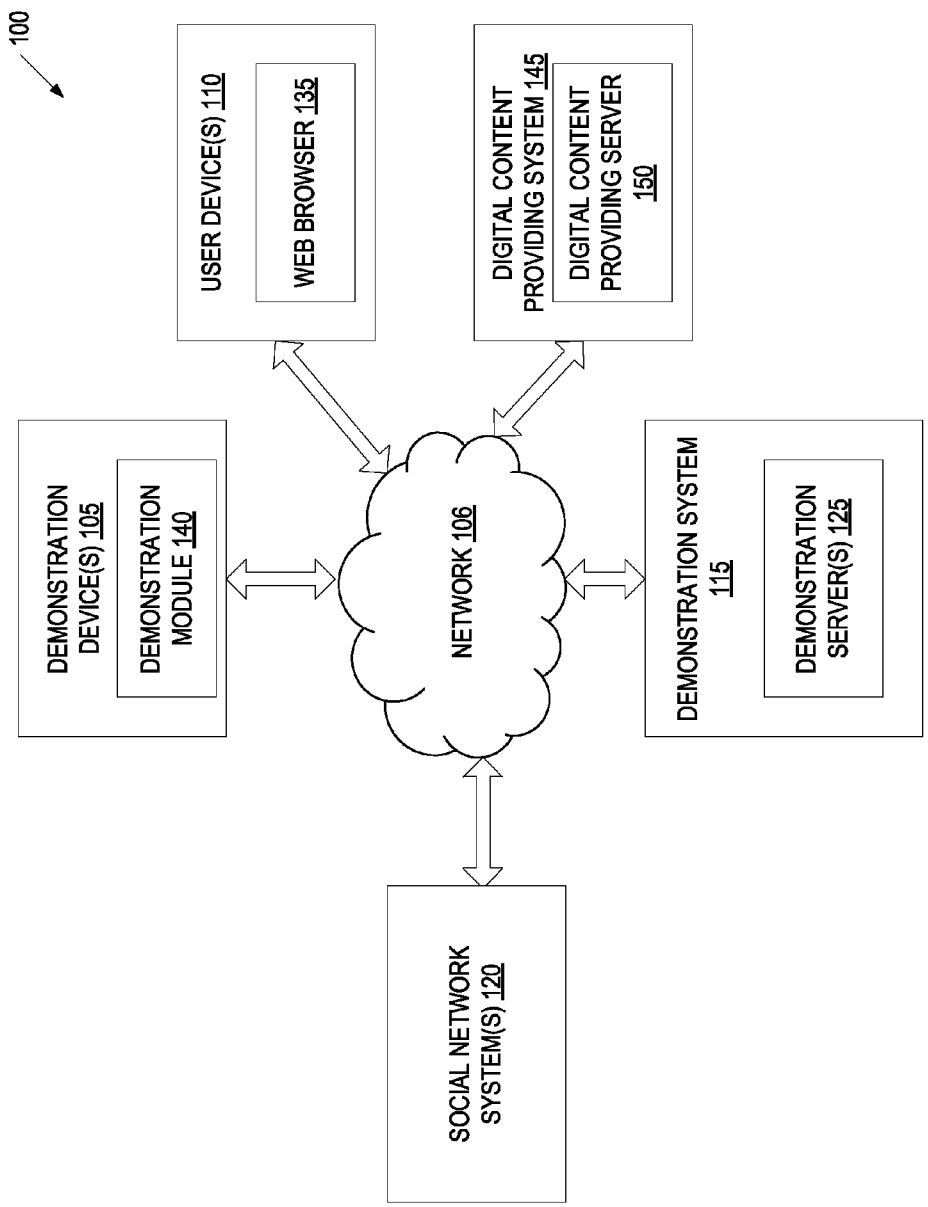
FIG. 1 is a block diagram of an exemplary network architecture, in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for a demonstration device and connected demonstration system. In one embodiment, a demonstration device that provides interactive demonstrations receives user input during a demonstration session. The demonstration device generates a demonstration account for the user based on the user input, the demonstration account comprising a user login and the demonstration session. The user device transmits the demonstration account to a demonstration server. The demonstration server may then transmit the demonstration session to any other demonstration device in response to receiving the user login from the other demonstration device. This enables a user to start a demonstration session on a first user device at a first retail store, and then continue the demonstration session at a later date from any other retail store that also has the demonstration device on display. The user may also continue the demonstration session from an online virtual demonstration device hosted by a demonstration server.

In one embodiment, during a demonstration session, the demonstration device receives an identification of at least one of a social network account, an email address or a network location from a user. The demonstration device then shares the interactive demonstration by sending, to at least one of the social network account, the email address or the network location, a link to the interactive demonstration. Any user may access the link (e.g., from a web browser) to initiate a new demonstration session online. This demonstration session may be hosted by a demonstration server, which may initiate a virtual demonstration device that has all of the functions of a physical demonstration device. Thus, a user may share an interactive demonstration provided by the demonstration device with friends and contacts. Users may also generate snapshots, video, voice recordings, text comments, etc. and share these with their friends and contacts directly from the demonstration device. Accordingly, embodiments of the present invention leverage social networking, blogs, email, and other communication channels to enable consumers to share a user experience for a demonstration device.

FIG. 1 is a block diagram of an exemplary network architecture 100, in which embodiments of the present invention described herein may operate. The network architecture 100 may include one or more demonstration devices 105, a demonstration system 115, one or more social network systems 120, a digital content providing system 145 and one or more user devices 110 connected via a network 106. Network 106 may include, for example, a public network such as the Internet, a private network such as a local area network (LAN), or a combination thereof.

Communication between the demo devices 105 and other network connected systems and devices (e.g., demo system 115, social network systems 120, digital content providing system 145 and/or user device 110) is enabled via a communication infrastructure (not shown). One example of such a communication infrastructure includes a combination of a wide area network (WAN) and wireless infrastructure, which allows a user to use the demo devices 105 to purchase digital content (e.g., electronic publications) and consume the digital content, share interactive demonstrations, store demo accounts, etc. without being tethered to the network 106 via hardwired links. The wireless infrastructure may be provided by one or multiple wireless communications systems, such as a wireless fidelity (WiFi) hotspot or a wireless carrier system (e.g., that can be implemented using various data processing equipment, communication towers, and other equipment). The communication infrastructure may also include a communication-enabling system that serves as an intermediary in passing information between the various network components. The communication-enabling system may communicate with the wireless communication system (e.g., a wireless carrier) via a dedicated channel, and may communicate with the digital content providing system 145 and/or demonstration system 115 via a non-dedicated communication mechanism, (e.g., a public Wide Area Network (WAN) such as the Internet).

Demonstration (demo) devices 105 may be portable computing devices such as electronic book readers, mobile phones, tablet computers, personal digital assistants (PDAs), portable media players, notebook computers, etc. that have demonstration firmware and/or software (herein referred to as demonstration module 140) instead of, or in addition to, consumer product firmware and/or software. The demo devices 105 may also be non-portable computing devices such as a set-top box, a television, a gaming console, a desktop computer, and so on that include demonstration module 140. Demo devices 105 may be placed on display at numerous retail (e.g., brick and mortar) stores to showcase functionality of an associated consumer device (a non-demonstration version of the demo device).

Demo module 140 provides much the same functionality that is provided by the software/firmware installed on an associated consumer device. However, demo module 140 may additionally include a guided tour of the demo device's 105 functions and abilities. Additionally, the demo module 140 may provide a subset of the functions available on the associated consumer device rather than all capabilities of the consumer device. The subset may be a simplified set of functions that showcase desirable functionality of the associated consumer device. Demo module 140 may also include additional functionality, which is described below.

Unlike traditional demo devices, demo devices 105 are able to connect to demonstration system 115, social network systems 120, user devices 110 and/or digital content providing system 145 during an interactive demonstration session. Demo module 140 may prompt a user to input an identifier (e.g., a user identifier) or create a user login after user interaction is detected. Demo module 140 may then generate a new demo account or demo credential (e.g., a demo token) or retrieve session information for an existing demo account or demo credential from demo system 115. Demo session information may be sent to the demo system 115 for storage. In one embodiment, the demo session information is associated with a demo account. Another demo device 105 may then use the user login or identifier to retrieve the demo session information and continue the demo session.

Demo module 140 may also record statistics regarding use of the demo device 105, and report such statistics to the demonstration system 115. Such statistics may include usage statistics for the demo device 105, for specific features of the demo device 105, for specific contents of the demo device 140, and so on. Demo module 140 may collect demographic information of users, and associate the statistics with the demographic information.

The demonstration system 115 may include a network-accessible server-based functionality (demonstration server 125), various data stores (not shown), and/or other data processing equipment. The demonstration system 115 may include one or more machines (e.g., one or more server computer systems, routers, gateways, etc.) that have processing and storage capabilities to provide the server-based functionality. In one embodiment, the demo system 115 is a virtual system that runs inside of a cloud infrastructure. For example, the demo system 115 may include virtual computers provided by Amazon's® Elastic Compute Cloud (EC2). The demo servers 125 may receive and store demo session information from demo devices 105. The demo session information may be associated with demo credentials, a user identifier, a user login, a demo account, etc. The demo servers 125 may then download the demo session information (e.g., for a demo session associated with a demo account) to demonstration devices to continue a saved demo session.

In one embodiment, the demo servers 125 host virtual demo devices that are accessible by user devices 110 via web browsers 135. The user devices 110 may be electronic book readers, mobile phones, tablet computers, personal digital assistants (PDAs), portable media players, notebook computers, desktop computers, and so on.

The virtual demo devices hosted by the demo servers 125 may include all of the functionality of the physical demo devices 105. The demo servers 125 may stream a display output of a virtual demo device to a connected user device 110. The browser may generate commands and send these commands to the demo servers 125 to control the virtual demo device. Therefore, consumers may spend as much time as they want experimenting with a demo device from the comfort of their own home. Users may also begin demo sessions from a physical demo device 105 at a retail store, and continue the demo session from home using a virtual demo device provided by the demo servers 125.

Referring back to the demonstration devices 105, in one embodiment, the demo module 140 includes functionality to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), and multi-media content. Additionally, the digital content may include active content such as programs and application that can be installed on the demonstration device 105.

The demo device 105 may connect to digital content providing system 145 to access digital content that is available to consumer devices associated with the demo devices 105. The digital content providing system 145 may correspond to any functionality or combination of functionality for providing electronic media items or other digital content to the consumer devices (not shown) and demo devices 105. In one embodiment, the digital content providing system 145 includes one or more machines that host a digital content providing server 150, which corresponds to an entity that provides electronic publications (e.g., electronic books) and other digital content (e.g., applications) to users upon the users' purchase of the items. In this role, the digital content providing server 150 may essentially act as a bookseller or the like. In other cases, the digital content providing server 150 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

Demo devices 105 may connect to one or more social network systems 120. Social network systems 120 may include, for example, Facebook®, LinkedIn®, Twitter®, Yelp®, etc. A user of a demo device 105 may input social network account login information on, or otherwise provide credentials (e.g., posting credentials such as a token for posting) to, the demo device 105. The demo module 140 may then share an interactive demonstration with contacts of the user's social network account. In one embodiment, demo module 140 posts a link to the interactive demonstration to the user's social network account or to a social network account of a contact of the user. Alternatively, the demo module 140 may send the social network account credentials to the demo servers 125, which then posts the link to the social network account using the credentials. A user of a user device 110 may access the link posted to the social network account via a web browser 135 to connect to a virtual demo device hosted by demo server 125. Demo device 105 and/or demo server 125 may additionally connect to other online systems (not shown), such as blogs or other web pages or servers. Additionally, demo device 105 and/or demo server 125 may send email messages that include the link to the interactive demonstration.

In one embodiment, demo module 140 includes functionality for connecting to user device 110. The demo module 140 may share a link to an active demo session with the user device 110 (e.g., via email, a social network account, etc.). The user device 110 may then access the link to establish a connection to the demo device 105 (provided that the demo session is still active). In one embodiment, the user device 110 accesses the link via web browser 135. In another embodiment, the user device 110 downloads a remote sharing module (not shown) from the demo server 125 in response to accessing the link. The user device 110 may then install and execute the remote sharing module to establish a connection with the demo device 105. In one embodiment, demo servers 125 facilitate the connection between the demo device 105 and the user device 110. In one embodiment, the demo servers 125 facilitate establishment of the connection, after which the demo device 105 and the user device 110 communicate directly. In another embodiment, the demo server 125 acts as an intermediary between the demo device 105 and the user device 110 throughout the connection. Alternatively, the demo device 105 may establish a connection with the user device 110 directly without help of the demo servers 125.

While the connection to the demo device 105 is active, the user device 110 may receive a stream of a display output of the demo device 105. Thus a user of the user device 110 may see the same displayed contents that a user of the demo device 105 sees. Additionally, the user device 110 may generate commands and send those commands to the demo device 105. The demo module 140 may perform operations in response to the commands as though the user of the demo device 105 had interacted with the demo device 105. Thus, a remote user can share in a demo session with a user of the demo device 105.

Figure 2:
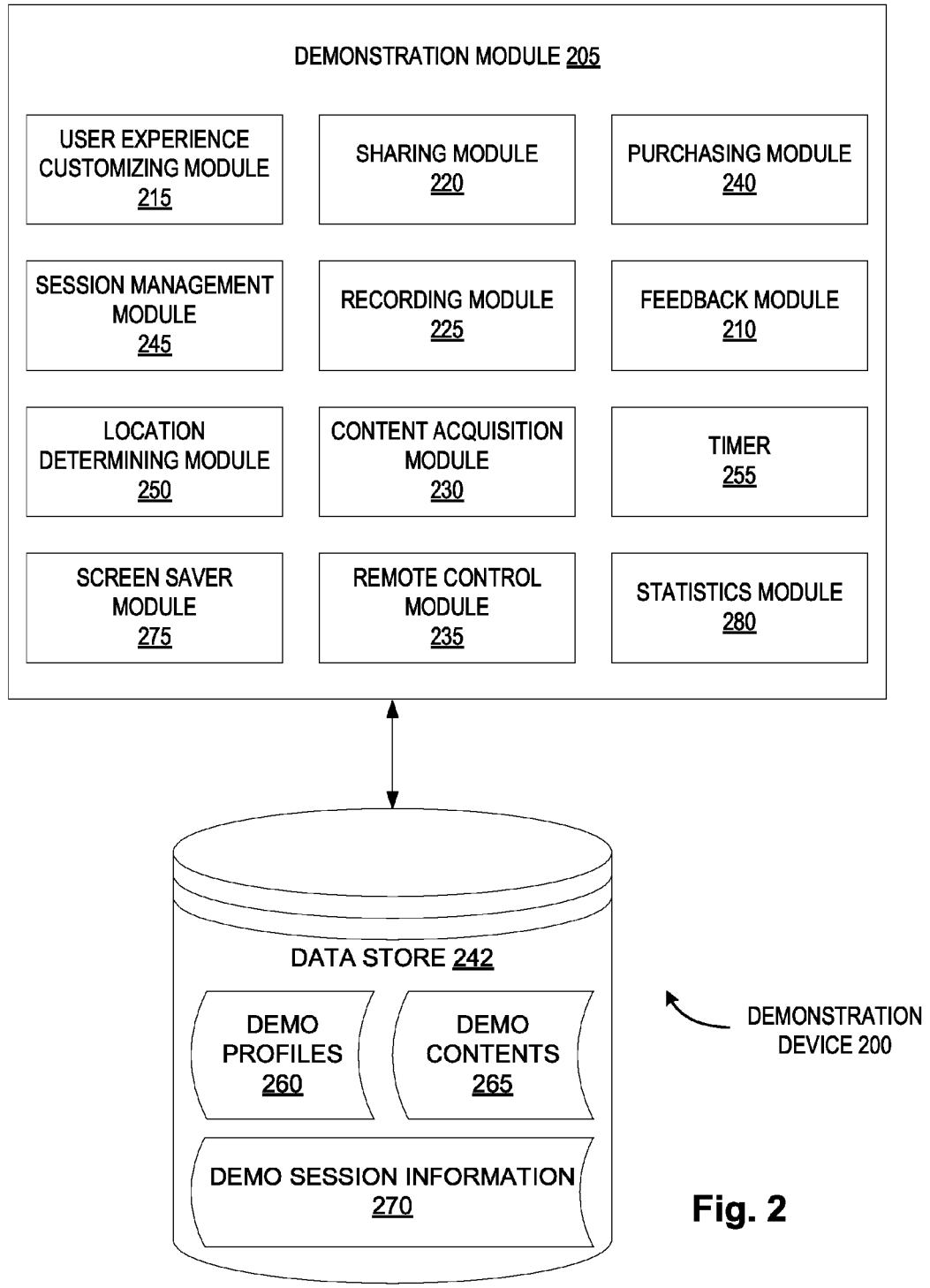
FIG. 2 is a block diagram illustrating a network connected demonstration device, in accordance with an embodiment of the present invention.

FIG. 2 is a block diagram illustrating one embodiment of a demonstration device 200 having a demonstration module 205 coupled to a data store 242. Demonstration device 200 may correspond to demonstration device 105 of FIG. 1. In one embodiment, demonstration module 205 includes functionality divided into multiple modules, as shown. Alternatively, one or more of the illustrated modules may be consolidated into a single module and/or the functionality of any of the illustrated modules may be subdivided into further modules. In one embodiment, demonstration module 205 includes a feedback module 210, a user experience customizing module 215, a sharing module 220, a recording module 225, a content acquisition module 230, a remote control module 235, a purchasing module 240, a session management module 245, a location determining module 250, a timer 255, a screen saver module 275 and a statistics module 280. Data store 242 may include a file system, database or other data management layer resident on a data storage device such as a disk drive, RAM, ROM, database, etc. Data store 242 may store demo profiles 260, demo contents 265, demo session information 270 and other data.

User experience customizing module 215 determines default settings and demo content to include in a demo session for a user. The settings may include a language, background images, screen saver, text font size, typeface, words per line, etc. Demo content may include electronic media items (e.g., ebooks, audio files, videos, etc.) and active content such as programs. In one embodiment, user experience customizing module 215 attempts to select settings and demo content 265 that will be most pertinent to a current user so as to emphasize features most relevant to the user and deemphasize features that are less relevant to the user. For example, demo content pertinent to a teenage student may include a high school text book, pop music, a video game and young adult literature. In contrast, demo content pertinent to a business professional may include a pdf document showing market trends, a suspense novel, a podcast, and a news recording.

In one embodiment, demo module 205 includes a location determining module 250. Location determining module 250 may determine a physical location (e.g., of a particular address or GPS coordinates) and/or a conceptual location (e.g., of a particular retail store). Location determining module 250 may determine a location of the demo device 200 using a global positioning system (GPS) receiver, triangulation of cell towers, and/or triangulation of wireless fidelity (WiFi) hotspots. Alternatively, or in addition, location determining module 250 may determine the demonstration device's 200 location based on an assigned internet protocol (IP) address (e.g., using an IP to GEO server). Additionally, location determining module 245 may determine demo device's 200 current location based on a hotspot (e.g., WiFi network) to which the demo device 200 is connected. For example, demo device 200 may be connected to a WiFi network that advertises its location. The location determining module 245 may also determine the demo device's 200 location based on user input (e.g., based on input of an employee of a retail store). In one embodiment, location determining module 250 determines a retail store at which the demo device 200 is located. For example, location determining module 250 may identify a specific Best Buy location, ATT storefront location, OfficeMax location, Airport location, etc.

In one embodiment, user experience customizing module 215 selects default settings and demo content 265 for a demo session based on the current location of the demo device 200. For example, the average shopper at Target® may be a 42 year old mother with 1.8 children and an annual income of $72K, and the average shopper at Best Buy® may be a 34 year old male with an annual income of $60K. The user experience customizing module 215 may tailor the demo session to appeal to the average shopper at the current retail store location of the demo device 200.

In one embodiment, user experience customizing module 215 selects default settings and demo content 265 at least in part based on a current date (e.g., based on a current season, based on a current holiday, etc.). For example, different demo contents 265 may be selected during the Summer season than during the Winter season. Additionally, specific demo contents 265 may be added prior to or during fathers day, mothers day, Christmas, etc.

In one embodiment, the user experience customizing module 215 prompts a user for demographic information. For example, the user experience customizing module 215 may prompt the user to indicate his/her age, gender, occupation, and so forth. User experience customizing module 215 may then tailor the demo session based on the received demographic information.

In one embodiment, user experience customizing module 215 presents a user with a list of pre-generated demo profiles 260. Examples of such demo profiles 260 include a teacher profile, a student profile, a businessman profile, an engineer profile, a homemaker profile, etc. Each demo profile 260 may include specific demo contents 265 and settings. The user may then select one of the pre-generated demo profiles 260 to initiate a demo session having demo contents and settings most pertinent to that user. In one embodiment, the demo profiles 260 are sales pitch profiles for selection by a sales person. For example, the sales person may determine that he will be presenting an interactive demonstration to a group of engineers, and may select an engineer sales pitch profile. In one embodiment, a user may select multiple demo profiles. Demo contents associated with the multiple demo profiles may then be included in the demo session.

Session management module 245 may prompt a user to select a user login and/or password. The user login may be an email address of the user or a user generated handle. Session management module 245 may alternately prompt the user to input a unique identifier. Account management module 245 may then query a demo server to determine whether the user login or identifier is already in use. If the user login or identifier is not in use, then a new demo account may be generated and associated with the provided user login. Alternatively, a new demo credential (e.g., a demo token) may be generated based on the provided identifier. If the user login or identifier is already in use, session management module 245 may ask the user whether they wish to continue a demo session associated with the user login or identifier. If the user login includes a password, then the user may be prompted to provide a password to continue the demo session. In one embodiment, the user login is an online retail account of the user. For example, the user may provide an Amazon.com® username and password for the user login and password.

Once a demo account or credential is generated, a current demo session is added to or associated with that demo account or demo credential. Additionally, demo session information 270 may be added to data store 242. The demo session may have been started when the user began interacting with the demo device 200 or when the user input a user login. During the demo session, any changes to settings made by the user are saved to the demo session information 270. Additionally, any digital content (e.g., media items and/or active content) that the user downloads to the demo device may be saved to the demo session information 270, and any demo content deleted by the user is removed from the demo session information 270. The user may also consume digital media items (e.g., read ebooks, listen to albums, etc.), run application, modify media items (e.g., highlight text, add bookmarks to ebooks, etc.). The results of all such user activity may be added to the demo session information 270 and saved. Therefore, for example, a user may continue reading a book on one demo device at the same location at which the user left off on another user device. Once the user terminates the demo session (e.g., by ceasing use of the demo device 200), the demo session information 270 may be uploaded to a demo server for storage.

Content acquisition module 230 connects the demo device 200 to a digital content providing server. Once demo device 200 is connected to the digital content providing server, a user may browse available digital contents of the digital content providing server via the demo device 200. The user may select and download desired digital content such as samples of ebooks. If the user associated his demo account with an online retail account, then the user may purchase full versions of any of the digital content via the demo account. Content acquisition module 230 may then download the samples and/or full versions of the digital content and access the digital content on the demo device 200. These digital contents may be added to the user's demo session information by account management module 245 and stored in data store 242.

Recording module 225 enables a user to generate screen shots, videos, voice recordings and text comments using the demonstration device 200. As the user navigates through the demo session, at any time the user may generate a screen shot to capture the display output. Additionally, the user may begin recording a video at any time, and then terminate the recording at a later time. The user may turn on a voice recording while the video is being recorded (or while the screenshot is displayed) or afterward. Additionally, the user may add text comments to the screenshot or video. The user may also generate text comments and/or voice recordings separate from any screenshot or recorded video. In one embodiment, the demo device 200 includes soft keys and/or hard keys for generating the screen shots, videos, voice recordings, text comments, etc. Alternatively, or in addition, the demo device 200 may include a menu (e.g., a dropdown menu) that includes commands for executing these operations. Thus, the user can generate their own review of the demo device 200 from the demo device 200 as they use it. The recorded videos, screenshots, comments and voice recording may then be added to the demo session information and stored (e.g., as demo account information 270).

Sharing module 220 shares interactive demonstrations, active demo sessions and/or user generated content (e.g., user reviews) with third parties. The user may request to share content at any time (e.g., by initiating execution of sharing module 220. The user may indicate what content to share (e.g., a new interactive demo, the user's demo session, user generated content (e.g., a user review), etc.). Sharing module 220 may then prompt the user to input one or more sharing channels. In one embodiment, sharing module 220 provides a list of possible sharing channels. The list may include email, Facebook, Twitter, LinkedIn, MySpace, YouTube®, etc. The user may also input an additional sharing channel such as a blog, file transfer protocol (ftp) site, telnet site, etc. In response to the user selecting an available channel, sharing module 220 may prompt the user for login information or other credentials (e.g., to a social network account or blog), for an email address, etc. The sharing module 220 may then use the provided information to share the specified content (e.g., by posting a link to a virtual demo device or a link to a user review). The posted links and/or additional content may include a brief description of the shared contents. In one embodiment, the sharing module 220 automatically generates the brief description (e.g., from a stored list of brief description options). Alternatively, the user may generate the brief description.

Recipients of the shared content may further share the content by posting/sending the links to additional recipients (e.g., via their social networks). These additional recipients may also share the content. Accordingly, social networks of users may be exploited to deliver a user driven marketing campaign for the consumer devices that originates from the demo devices 200.

In one embodiment, sharing module 220 sends the sharing request along with the selected content and/or sharing channel information to a demo server. The demo server may then share the content using the specified channel. Alternatively, the sharing module 220 may share the selected content with the sharing channel directly. For example, the sharing module 220 may login to Facebook using provided login credentials and post a user review (e.g., including screenshots, video, voiceover and/or text comments) and/or a link to an interactive demonstration to the user's Facebook account.

In one embodiment, one sharing option is to share a current demo session. In such an embodiment, sharing module 220 may share a link with a third party. The third party may access the link via a web browser or remote sharing module on a user device. A demo server may establish a connection between the demo device 200 and the user device. Alternatively, the user device may connect directly to the demo device 200 without assistance from the demo server. The remote control module 235 then streams a display output of the demonstration device 200 to the user device (or to the demo server, which then forwards the display output to the user device). Additionally, a user of the user device is provided with controls that the user can manipulate to control the demo device 200. The remote control module 235 may receive such commands and execute them as though they originated from the demo device 200. Therefore, multiple users can simultaneously share in a demo session from different locations.

Feedback module 210 enables a user to provide feedback to a manufacturer of the demo device. Feedback module 210 may send any such feedback to the demo server for review by the manufacturer.

The demo module 205 may include a purchasing module 240. A user may invoke the purchasing module 240 (e.g., by pressing a purchase button) to initiate a purchase order. The purchase order may be an online purchase order with an online retailer (e.g., Amazon.com) or may be an in store purchase order at a brick and mortar retail store. In response to the purchase order being generated, the purchasing module 240 may add a purchase tag to the demo session information 270, signifying that the demo session and/or a demo account that includes the demo session is associated with a purchased consumer device. Once the user acquires their newly purchased consumer device, they may enter the user login or identifier for their demo session. The device settings and/or demo contents that were included in the demo session may then be downloaded to the consumer device and applied to the consumer device. Therefore, any settings adjustments that the user made to the demo device 200 will also be applied to the newly purchased consumer device. Additionally, any digital content that the user acquired during the demo session may be added to the consumer device.

Statistics module 280 records usage statistics of the demo device 200. Such usage statistics may include statistics on downloaded or accessed demo content, device functions that were used, demographic information of users, demo session length, reuse of demo sessions, content sharing, and so on. This information may be reported to the demo servers and combined with other usage statistics to better market the associated consumer device.

When a consumer first picks up the demo device 200 in a retail store, the demo device 200 may be in a default state. As a demo session commences, settings may be changed, digital content may be added and/or removed, and so on. Preferably, the demo device 200 should return to the default state for future users. Accordingly, in one embodiment demo module 205 includes a timer 255 that keeps track of an amount of time that has passed since a user last interacted with the demo device 200. If no user interaction has been detected for a threshold amount of time (e.g., one minute, five minutes, etc.), then timer 255 issues a rest command. The reset command may cause a current demo session to end and the demo module 205 to return to a default state. This may include uploading the demo session information to a demo server and deleting any digital content that was added during the demo session (e.g., downloaded content, generated reviews, etc.). Thus the demo device 200 is ready for a next customer.

In one embodiment, timer 255 invokes screen saver module 275 when no activity has been detected for a threshold amount of time. Screen saver module 275 initiates a screen saver. While the screen saver is active, screen saver module 275 may cycle through a series of screens, each of which highlights a particular function of the demo device 200. When demo device 200 detects a user input, screen saver module 275 may terminate the screen saver.

Figure 3:
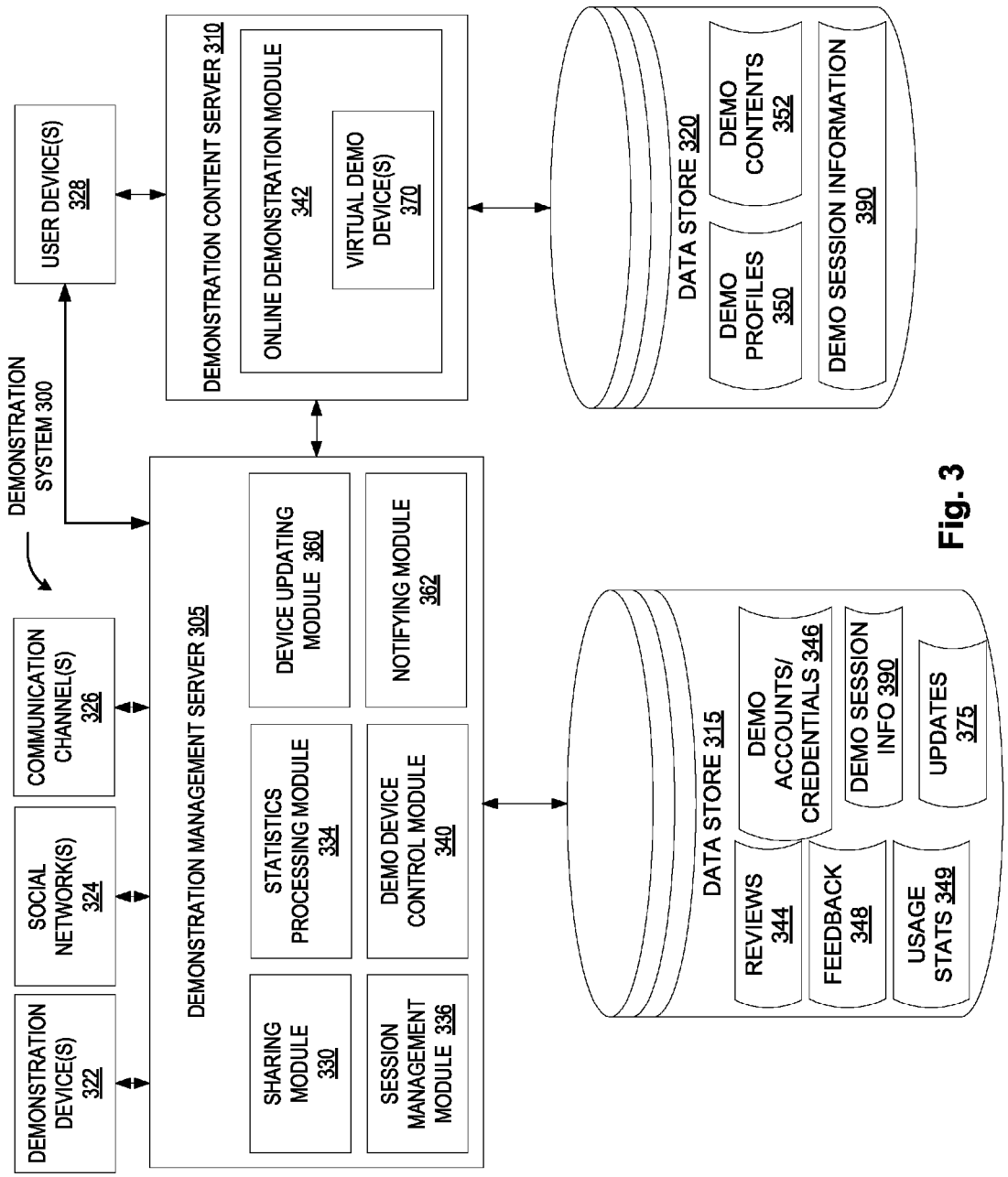
FIG. 3 is a block diagram illustrating a network connected demonstration system, in accordance with an embodiment of the present invention.

FIG. 3 is a block diagram illustrating one embodiment of a demonstration system 300, which may correspond to demonstration system 115 of FIG. 1. In one embodiment, the demonstration system 300 includes a demonstration management server 305 and a demonstration content server 310, which may be connected via a network. In one embodiment, the demo management server 305 and demo content server 310 are hosted by virtual machines in a cloud computing environment. Alternatively, servers 305, 310 may be hosted by physical machines. Each demo server 305, 310 may be connected to a data store 315, 320. In one embodiment, data stores 315, 320 are provided by a cloud storage system (e.g., by Amazon's Simple Storage Service (S3)). Alternatively, the data stores 315, 320 may include physical data stores (e.g., hard disk drives). In one embodiment, the demonstration management server 305 and demonstration content server 310 are combined into a single demonstration server. Additionally, the data stores 315, 320 may be combined into a single data store.

In one embodiment, demo management server 305 includes a sharing module 330, a session management module 336, a statistics processing module 334, a device updating module 360, a notifying module 362 and a demo device control module 340. Alternatively, these modules may be combined or subdivided into additional modules.

Session management module 336 manages demo sessions. This may include managing demo accounts and/or demo credentials 346 associated with demo sessions and managing demo session information 390. Demo management server 305 may receive an identifier and/or user login information (which may include a password) from a demo device 322. In response, account management module 366 may determine whether the identifier or user login information matches an identifier or a user login associated with any demo sessions. This may include determining whether the identifier or user login is associated with a demo account or demo credential. If the received user login or identifier fails to match a stored user login or identifier, then account management module 336 may generate a new demo account and/or credential 346 and notify the demo device that the new demo account or credential has been generated. If the received user login or identifier matches a stored user login or identifier, then session management module 336 may download the demo session information (including device settings, demo content, user added content, etc.) associated with that identifier or login to the demo device. The demo session information 390 may have been previously uploaded to the demo management server 305 by the same demo device as the one to which it is downloaded or by a different demo device.

When a user of the demo device 322 terminates a demo session on the demo device 322, the demo device may automatically send the demo session information 390 or an update of the demo session information 390 to the demo management server 305. The user may then later provide the login information or identifier to any other demo device 322 to cause session management module 336 to download the demo session information 390 to that other demo device 322. The user may then continue a demo session that they had previously started on a different demo device.

In one embodiment, a user may issue a purchase command via the demonstration device 322. The account management module 336 may then transfer settings and/or contents of the demo session to a consumer device that the user purchased. After the transfer is complete, the account management module 336 may delete the demo session information 390, a demo account, demo credentials, etc. associated with that demo session. In one embodiment, account management module 336 sets a purchased flag on the demo account 346 of the user to signify that settings and contents of the demo session are to be transferred to a purchased consumer device.

During a demo session, a user of a demo device 322 may generate feedback 348, which the demo device 322 may upload to demo management server 305 and store in data store 315. Additionally, the user of the demo device 322 may generate reviews 344, which may include snapshots, video recordings, voiceovers, text comments, etc. Demo device 322 may upload such reviews 344 to demo management server 305, which may store the reviews 344 in data store 315. Additionally, the reviews may be included in demo session information 390.

Demo devices 322 may upload usage statistics (stats) 349 to demo management server 305, which may be stored in data store 315. The usage statistics 349 are received from multiple hardware demo devices 322 located at various retail locations and/or from virtual demo devices 370. Statistics processing module 334 may analyze the usage statistics 349 to identify, for example, most frequently accessed demo contents, most frequently used device features, and so on. The usage statistics 349 may be subdivided into categories based on demographic information. For example, statistics processing module 334 may determine the most used device features and demo contents at Target retail stores and/or by middle aged women. Demo management server 305 may then generate new demo profiles and/or modify existing demo profiles based on the usage statistics 349. Demo management server 305 may propagate the new and/or updated demo profiles to all demo devices 322.

Users of demo devices 322 may request to share interactive demonstrations and/or user generated reviews 344. In one embodiment, demo management server 305 receives sharing requests from demo devices 322. The sharing requests may include an identification of sharing channels, credentials required to access the sharing channels (e.g., credentials such as a token or login and password for a social network account), and/or an identification of content to share. The content may include a review 344, an interactive demonstration, a current demo session of a user, etc. Sharing module 330 establishes connections with the specified sharing channels (e.g., social networks 324 and/or communication channels 326) and shares the specified content. Sharing module 330 may, for example, post a link to a virtual demo device 370 on an account of a social network 324, or post a review 344 or a link to a review 344 on a social network 324. Additionally, sharing module 330 may post a link to a current demo session on a demo device 322.

Demo device control module 340 connects user devices 328 to demo devices 322. User devices 328 may connect to demo devices 322 by accessing a demo session link that was shared by the demo device 322. Demo device control module 340 may receive a request to connect to a demo session on a demo device 322 in response to a user accessing such a link. In one embodiment, demo device control module 340 verifies whether the demo session specified in the link is currently active on a demo device 322. If the demo session is active on a demo device 322, then demo device control module 340 may send a command to the demo device 322 to cause the demo device 322 to begin streaming a display output of the demo device 322 to the demo device control module 340. The demo device control module 340 may then forward this stream to the user device 328. Alternatively, the demo device 322 may send the stream directly to the user device 328. A user of the user device 328 can therefore see the same display output that is presented to a user of the demo device 322. If the demo session is not active, then the demo device control module 340 may forward the request to demo content server 310. Online demonstration module 342 may then load the demo session on a virtual demo device 370 for the user device. Functionality of the demo content server 310 is described below.

Demo device control module 340 may provide to a user device 328 an interface that resembles an interface of the demonstration device 322. This interface may include buttons corresponding to all of the hardware keys/buttons of the demo device. Via the interface, the user device 328 may generate any command that can be generated based on user interaction with the demo device 322. Such generated commands are sent from the user device 328 to the demo control module 340. The demo control module 340 then forwards the commands to the demo device 322. The commands cause the demo device to perform an action or actions as though the commands had been entered by a user of the demo device 322.

In one embodiment, the interface provided by the demo device control module 340 is provided via a web browser running on the user device. Alternatively, the demo device control module 340 may install a demo sharing module on the user device. The demo device control module 340 can then present the streamed display output and controls on the user device using the demo sharing module executing on the user device.

The demo device control module 340 enables a remote sales person or technical support person to guide a user through a demo session. The remote sales person may control the demo device that is being used by the user, and may explain the features of the demo device 322 while they control the demo device 322. For example, if the demo device 322 includes a speaker, then the demo device 322 may output the sales person's voice while the sales person guides the user through the demo session.

Occasionally software and/or firmware updates 375 to demo devices may be released. When such updates 375 are released, they may be loaded into data store 315. Device updating module 360 may then install the updates on the demo devices 322. Therefore, the demo devices 322 may be updated automatically without replacing the demo devices 322 or recalling the demo devices 322 for manual updating.

Notifying module 362 tracks updates to consumer devices and/or demo devices (e.g., updates 375) that have occurred since a user last logged into a demo account or otherwise accessed a demo session. In one embodiment, notifying module 362 generates notifications identifying these updates and sends these notifications to users of the demo sessions or accounts. These notifications may be sent using any known contact information of the users, such as email addresses, social network accounts, physical addresses, and so on. Notifying module 362 may also send out notifications regarding promotional offers, new consumer devices, and so on.

Demo content server 310 provides interactive demonstrations to user devices 328. These interactive demonstrations may mimic the experience of navigating through an interactive demonstration on a hardware demo device 322. In one embodiment, demo content server 310 includes an online demonstration module 342 that hosts virtual demo devices 370. Each virtual demo device 370 may include all of the functionality of a hardware demo device 322. Demo content server 310 is connected to data store 320, which contains demo contents 352, demo profiles 350 and/or demo session information 390.

A user of a user device 328 connects to a virtual demo device 370 by accessing a link to an interactive demonstration that was shared by a demo device 322. In response to the user device 328 accessing the link, the online demo module 342 may start a new virtual demo device 370 and assign it to the user device 328 or assign an idle virtual demo device 370 to the user device 328. The user may interact with the virtual demo device 370 through a web browser executed on the user device 328. Via the web browser, the user may issue commands to open demo content, access a digital content providing system (e.g., an online electronic book store), record a review, share an interactive demonstration, purchase a consumer device, or perform any other actions that are described herein with reference to a hardware demonstration device. In another embodiment, demo content server 310 downloads demo software to user devices 328. The user devices 328 may then install and execute the demo software to initiate a virtual demo device on the user device.

A demo account, demo credential and/or new demo session may be generated by the virtual demo device 370, and may be stored by the demo management server 305 in data store 315. Therefore, a user of the user device 328 may later visit a retail store that has a demo device 322 on display, enter a user login or identifier for a demo session that was started by the virtual demo device 370, and continue the demo session on the demo device 322. Alternatively, the link may contain user login or identifier for a shared demo session. The virtual demo device 270 may accordingly resume a previously stored demo session rather than starting a new demo session.

Figure 4:
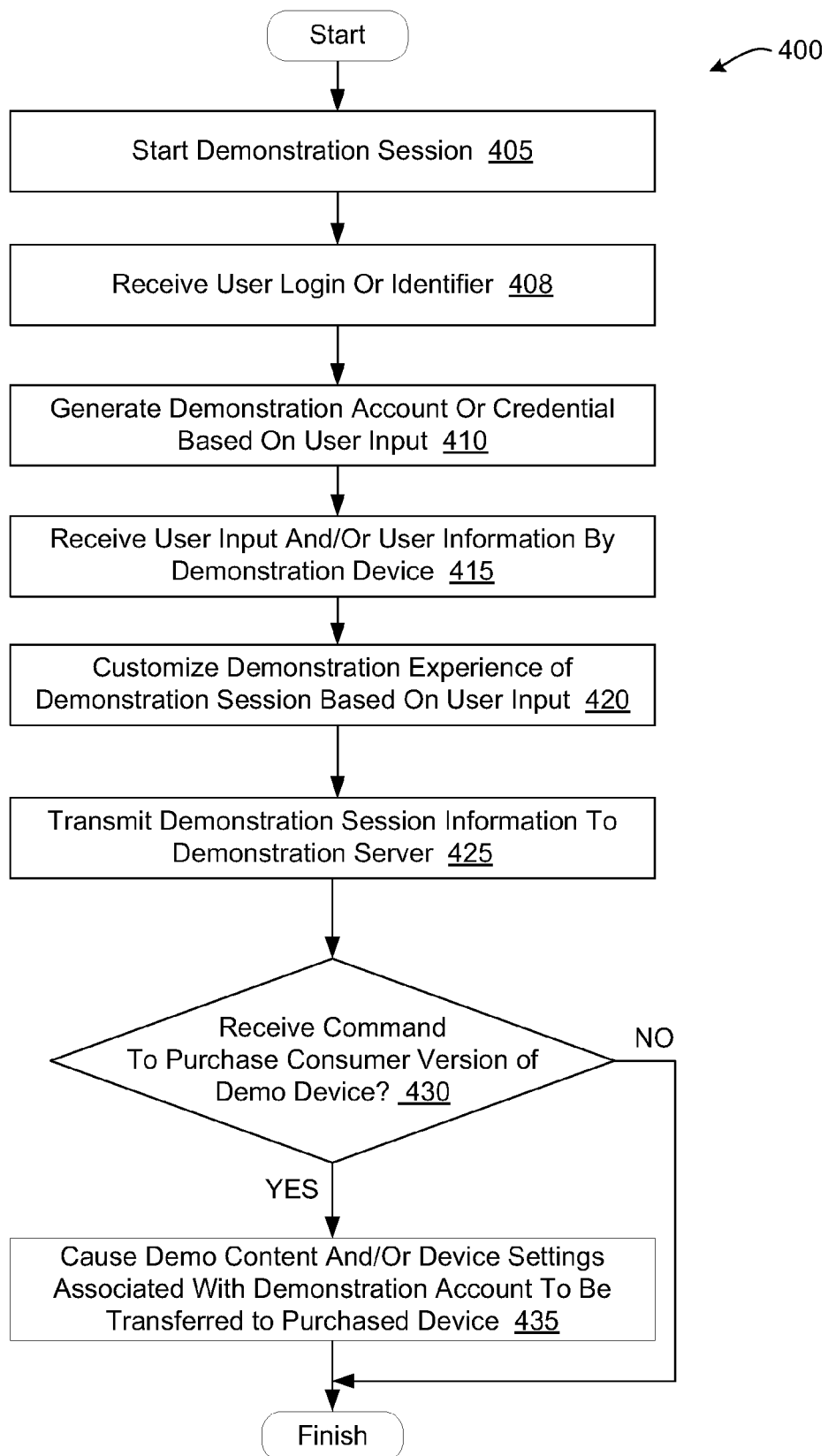
FIG. 4 is a flow diagram illustrating one embodiment for a method of providing a demonstration session to a user of a demonstration device.

FIG. 4 is a flow diagram illustrating one embodiment for a method 400 of providing a demonstration session to a user of a demonstration device. The method 400 may be performed by processing logic that comprises hardware (e.g., circuitry, dedicated logic, programmable logic, microcode, etc.), software (e.g., instructions run on a processor to perform hardware simulation), or a combination thereof. In one embodiment, method 400 is performed by demonstration module 205 executed by a demonstration device 200, as shown in FIG. 2.

Referring to FIG. 4, at block 405, a demonstration device starts a demonstration session. The demonstration session may be started when a user picks up and begins interacting with the demonstration device (e.g., by pressing keys on the demonstration device). At block 408, the demo device receives a user input of an identifier. The identifier may be a user login and/or password, or any other type of unique identifier. At block 410, the demo device generates a demo account or credential based on the user input. A demo account may include the user login, password and demo session information. A demo credential may be associated with the demo session information.

At block 415, the demonstration device receives user input and/or user information. The user input may include a user selection of a predefined demo profile and/or a user input of user demographic information. Additionally, the user input may include a user selection of specific device settings (e.g., background, font size, volume, font type, screen orientation, screen saver, etc.) and/or downloadable contents (e.g., digital books, movies, music albums, applications, etc.). The user information may include user demographic information, user name, user address, user email and/or additional user information. The user information may be received based on data received from a device or object associated with the user via near field communication (NFC), radio frequency identification (RFID), a credit card account, etc. At block 420, the demo device customizes a demonstration experience of the demo session based on the user input (e.g., by changing the device settings, downloading selected content, etc.), and/or the user information. The demo session information may be updated to include the device settings, content, etc. that was selected by the user during the demo session. This demo session may be added to a new demo account.

At block 425, the demo device transmits the demo session information to a demonstration server. The demo server may store the demo session information for use on other demo devices.

At block 430, the demo device determines whether a command to purchase a consumer version of the demo device (referred to herein as a consumer device) has been received. If such a command is received, the method continues to block 435, and the demo device causes demo content and/or device settings associated with the demo session information to be transferred to the purchased consumer device. Otherwise, the method ends.

Figure 5:
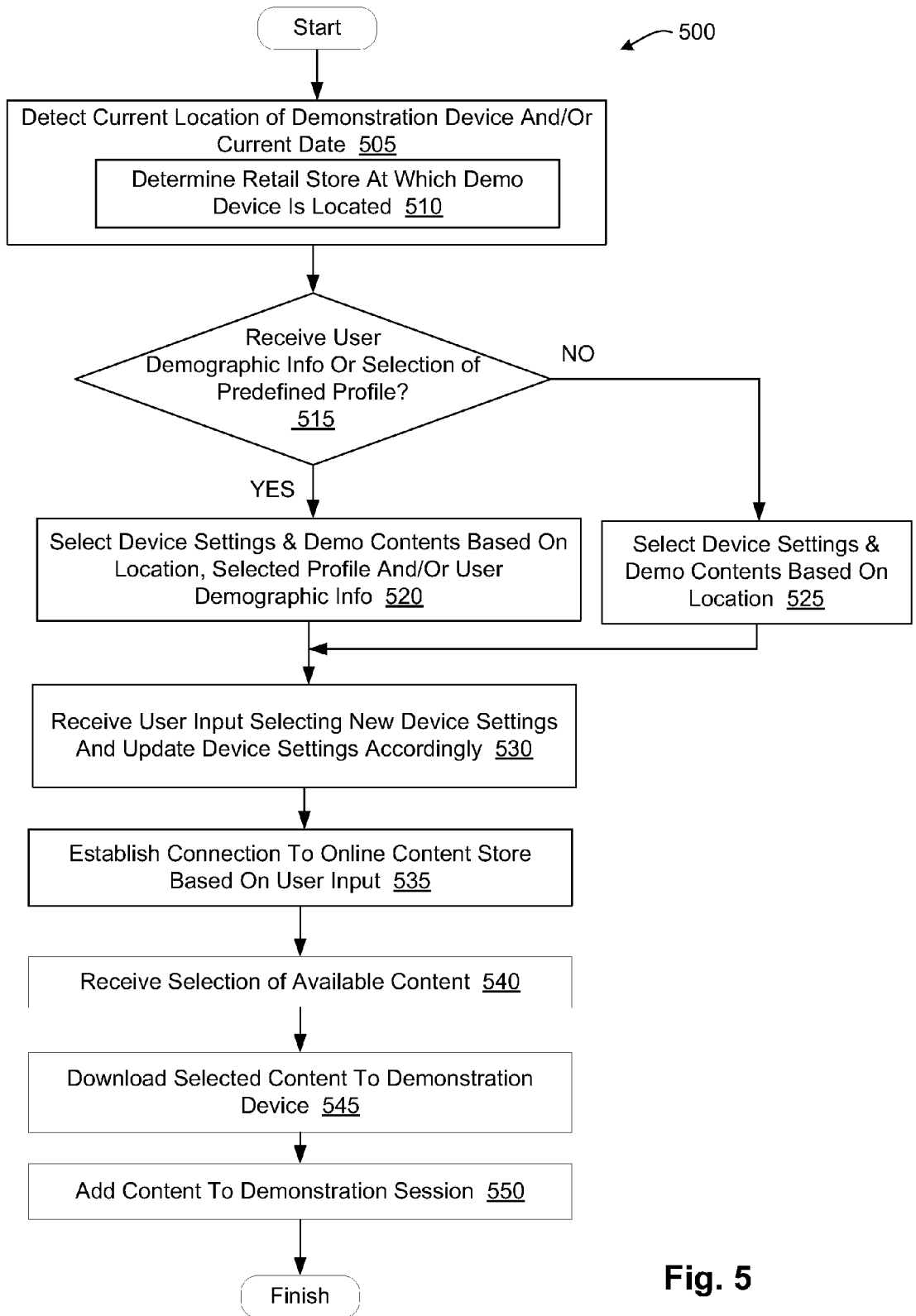
FIG. 5 is a flow diagram illustrating one embodiment for a method of customizing a demonstration session for a user of a demonstration device.

FIG. 5 is a flow diagram illustrating one embodiment for a method 500 of customizing a demonstration session for a user of a demonstration device. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 is performed by demonstration module 205 executed by a demonstration device 200, as shown in FIG. 2. In one embodiment, method 500 is performed at block 420 of method 400.

Referring to FIG. 5, at block 505, a demonstration device detects its current location and/or a current date. The demo device may detect its current location based on an assigned IP address, based on a GPS receiver, based on cell tower triangulation, based on a WiFi network to which the demo device is connected, or by other means. In one embodiment, at block 510, detecting the current location comprises determining a retail store at which the demo device is located (e.g., Target, Best Buy, etc.). The demo device may detect the current date based on an internal clock or based on querying a demo server or other server.

At block 515, the demo device determines whether a user has input demographic information and/or selected a predefined demo profile. The demo device may also determine whether any user demographic information or other user information has been received without the user typing the information or otherwise selecting the information in the demo device. In one embodiment, the demo device receives user demographic information (or other user information) via a wireless technology from an electronic device or an object carried by the user (e.g., from a mobile device with near field communication (NFC), from a radio frequency identification (RFID) enabled device, etc.). The demo device may also receive user demographic information based on a card swipe of the user's credit card with the demo device or with an additional device with which the demo device is connected (directly or via a network). If no user information is available, then the method continues to block 525, and the demo device selects device settings and demo contents based on the determined location and/or the current date. If the user has input (or otherwise provided) demographic information (or other information) and/or selected a predefined profile, then the method continues to block 520, and the demo device selects device settings and demo content based on the location, current date, selected profile and/or user demographic information.

At block 530, the demo device receives user input selecting new device settings. The demo device updates the device settings in accordance with the user input.

At block 535, the demo device establishes a connection (e.g., a wireless connection or a wired connection) to an online content store (e.g., as provided by a content providing system) based on user input. At block 540, the demo device receives selection of available digital content (e.g., a digital book for sale at the online content store). At block 545, the demo device downloads the selected digital content. At block 550, the downloaded content is added to a current demo session. Any of blocks 530-550 may be performed repeatedly until a user stops interacting with the demo device.

Figure 6:
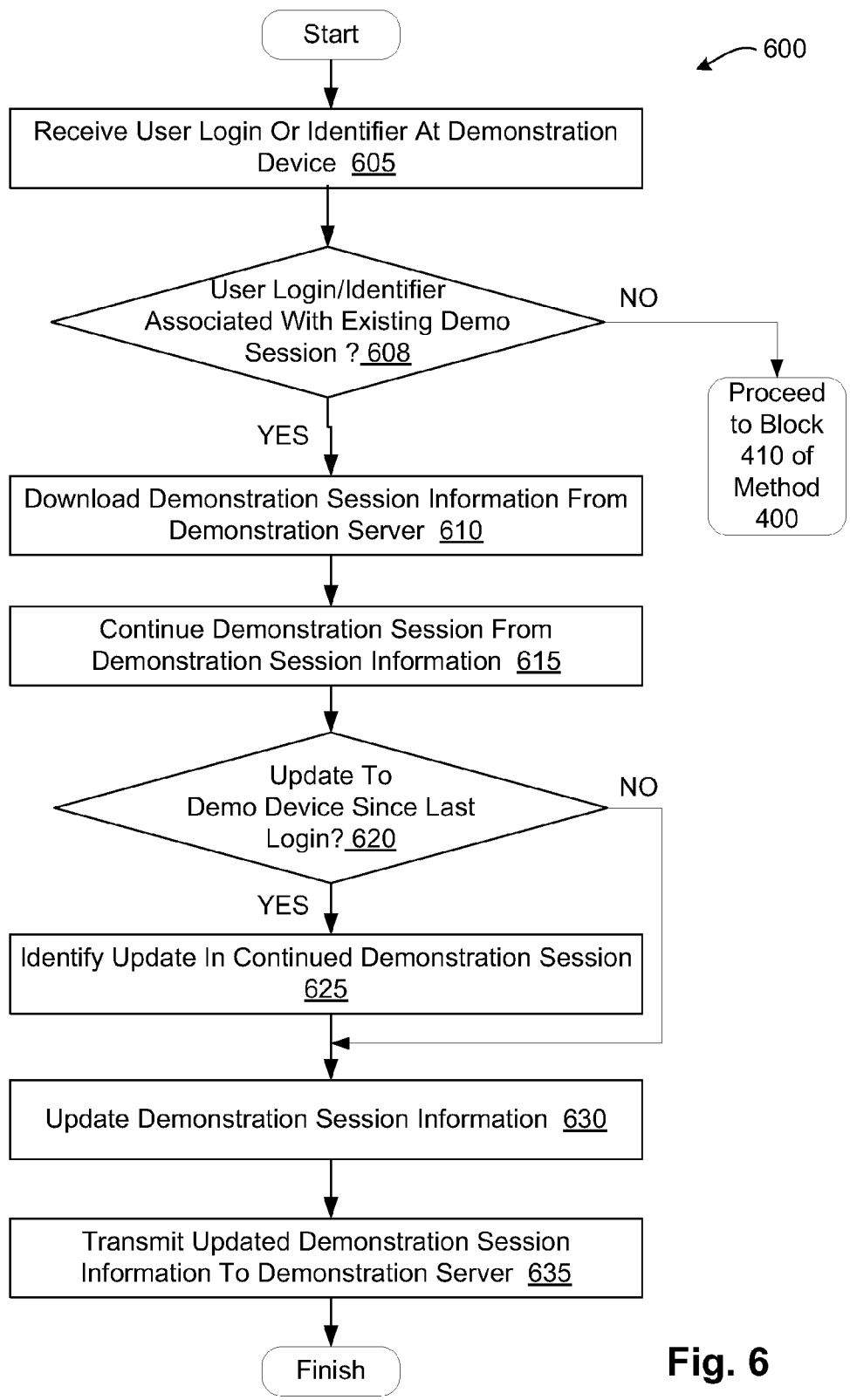
FIG. 6 is a flow diagram illustrating one embodiment for a method of continuing a previously stored demonstration session by a demonstration device.

FIG. 6 is a flow diagram illustrating one embodiment for a method 600 of continuing a previously stored demonstration session by a demonstration device. The method 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 600 is performed by demonstration module 205 executed by a demonstration device 200, as shown in FIG. 2.

Referring to FIG. 6, at block 605, a demo device receives a user login or an identifier. At block 608, the demo device determines whether the user login or identifier is associated with an existing demo session (e.g., with a demo account that includes the demo session). The demo device may make this determination by sending a query that includes the user login or identifier to a demo server, which may check a demo session database for the user login. If the user login or identifier is not associated with an existing demo session, the method ends and the demo device begins method 400 from block 410. If the user login or identifier is associated with an existing demo session, the method proceeds to block 610.

At block 610, the demo device downloads the demo session information associated with the user login or identifier from the demo server. The downloaded demo session information may include the user login or identifier, device settings, demo content, and so forth. At block 615, the demo device continues the demonstration session from the demo session information.

At block 620, the demo device determines whether there was an update to the demo device since the user last logged in to the demo session. Such an update may include, for example, a new model release, new device firmware, a price change, new promotional offers, new available content (e.g., provided by an online content store), and so forth. If there are any new updates, the method continues to block 625, and the updates are identified in the continued demonstration session. For example, when the user logs in to the demo session, an opening page may explain the update. If there is no update, the method proceeds to block 630.

At block 630, the demo device updates the demo session information based on any actions performed by the user during the continued demo session (e.g., any recent downloads, device setting changes, etc.). At block 635, the demo device transmits the updated demo session information to the demo server. Therefore, the demo session may later be continued from another demo device.

Figure 7:
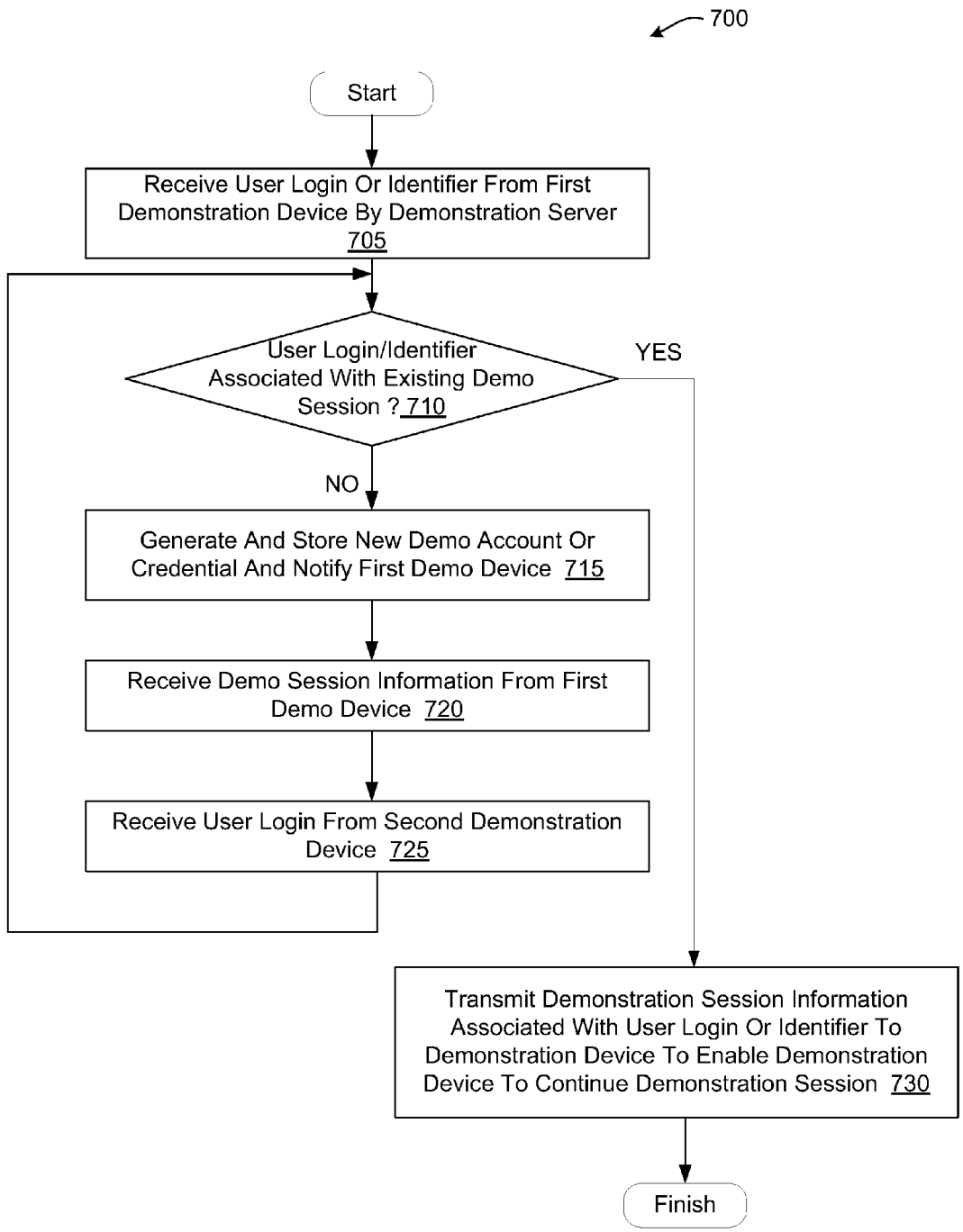
FIG. 7 is a flow diagram illustrating one embodiment for a method of managing demonstration sessions by a demonstration server.

FIG. 7 is a flow diagram illustrating one embodiment for a method 700 of managing demonstration sessions by a demonstration server. The method 700 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 700 is performed by a demonstration server, such as demo management server 305 as shown in FIG. 3.

Referring to FIG. 7, at block 705, a demo server receives a user login or other identifier from a demonstration device. At block 710, the demo server determines whether the user login or identifier is associated with an existing demo session. In one embodiment, the demo server queries a data store that stores demo session information using the received user login or identifier as a key. The data store may include a database, a flat file system, cloud storage, or some other type of data store. If the user login or identifier is not associated with an existing demo session, the method continues to block 715. Otherwise, the method proceeds to block 730.

At block 715, the demo server generates a new demo account having the received user login or identifier. The demo credential may simply be the provided identifier, or may be a token (which may be associated with the identifier). This demo account or credential may then be stored in a data store (e.g., in a database). The first demonstration device is notified of the new demo account or credential.

At block 720, the demo server receives demo session information for a demo session from the demo device. The demo session information may include device settings and user added content (e.g., user reviews, downloaded digital media items, etc.). The demo session information may also include information that captures any activity that a user performed during the demo session. This may include bookmarks or user added highlights for ebooks, saved games or files for applications, and so on.

At block 725, the demo server receives the user login or identifier from a second demonstration device. The method then returns to block 710. At block 710, the demo server determines that the user login or identifier is associated with an existing demo session, and the method continues to block 730.

At block 730, the demo server transmits the stored demo session information of the demo session associated with the received user login or identifier to the demonstration device (e.g., to the second demonstration device). The second demonstration device, for example, can then continue the demonstration session that was started on the first demonstration device.

Figure 8:
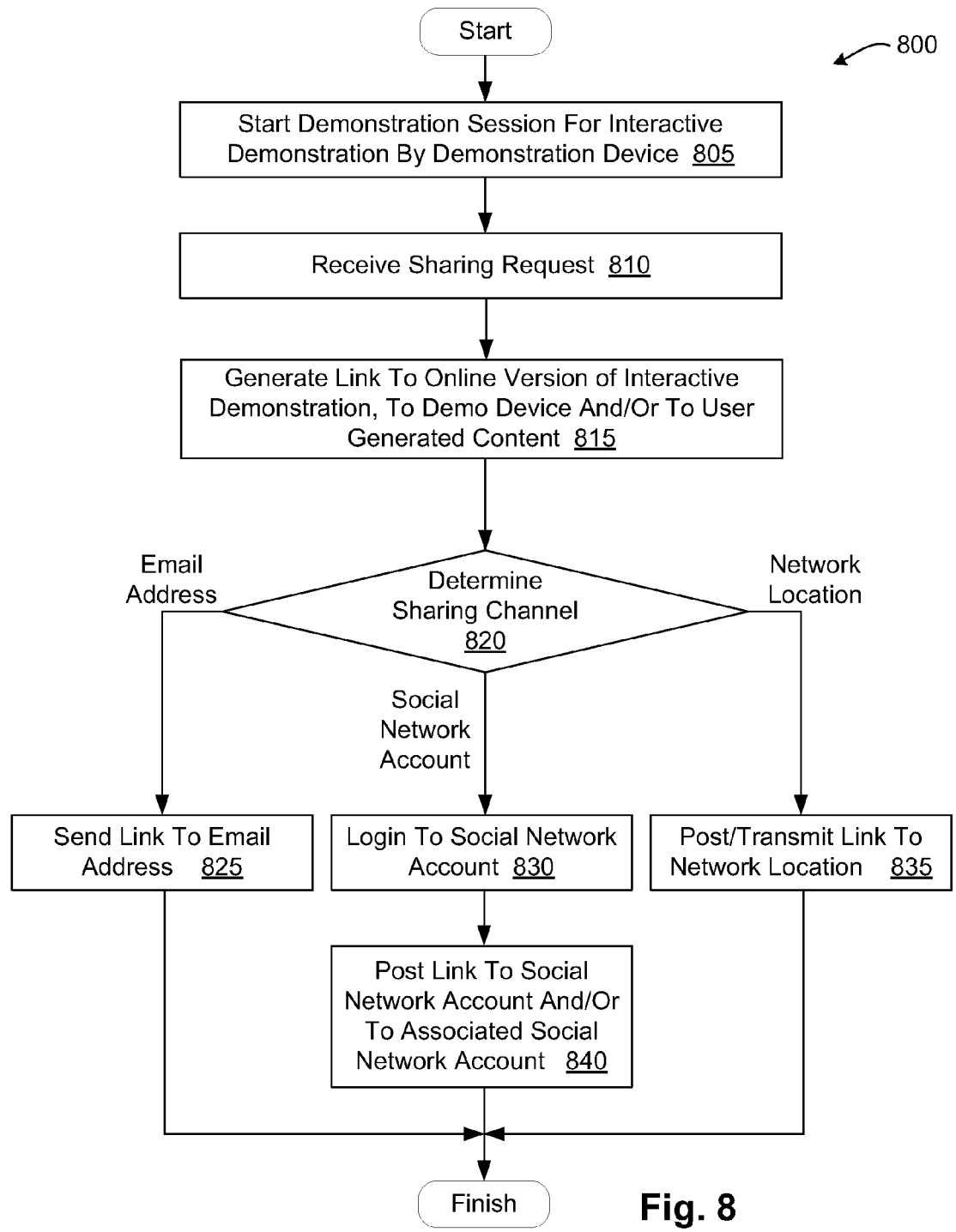
FIG. 8 is a flow diagram illustrating one embodiment for a method of sharing an interactive demonstration by a demonstration device.

FIG. 8 is a flow diagram illustrating one embodiment for a method of sharing an interactive demonstration by a demonstration device. The method 800 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 800 is performed by demonstration module 205 executed by a demonstration device 200, as shown in FIG. 2.

Referring to FIG. 8, at block 805, a demo device starts a demonstration session for an interactive demonstration. At block 810, the demo device receives a sharing request. The request may be a request to share user generated content (e.g., screenshots, videos, voice comments, text comments, etc. that have been recorded by the user on the demo device), a new interactive demonstration and/or a current demonstration session.

At block 815, the demo device generates a link the content that the user wanted to share. The link may be a link to an online version of the interactive demonstration (e.g., to a virtual demo device hosted by a demo server), to the current demo device, or to user generated content.

At block 820, the demo device determines a sharing channel. In one embodiment, the demo device prompts the user to select one or more sharing channels. Alternatively, a current demo account may include default sharing channels. Examples of sharing channels include social network accounts, email addresses, network locations, etc. If the sharing channel is an email address, the demo device generates an email that includes the link, and sends the email to the email address (block 825). If the sharing channel is a social network account, the demo device may access the social network account using user provided credentials (block 830), and subsequently post the link to the social network account and/or to an associated social network account (block 840). If the sharing channel is a network location (e.g., an FTP server or Telnet server), then the demo device uploads the link to the network location. The demo device may also post the link to blogs or other web pages.

Figure 9:
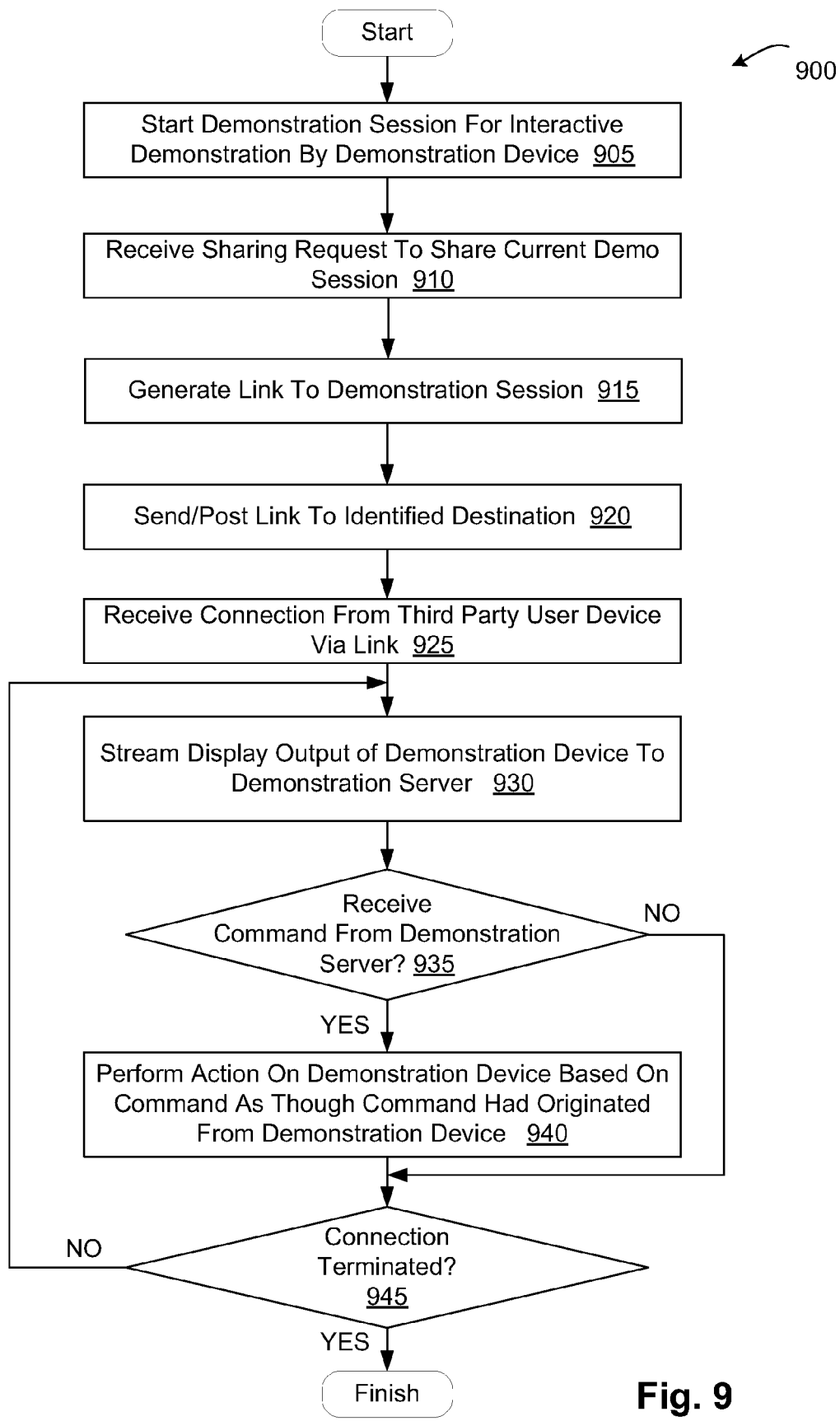
FIG. 9 is a flow diagram illustrating another embodiment for a method of sharing an interactive demonstration by a demonstration device.

FIG. 9 is a flow diagram illustrating another embodiment for a method of sharing an interactive demonstration by a demonstration device. The method 900 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 900 is performed by demonstration module 205 executed by a demonstration device 200, as shown in FIG. 2.

Referring to FIG. 9, at block 905, a demo device starts a demonstration session for an interactive demonstration. At block 910, the demo device receives a sharing request to share a current demo session. At block 915, the demo device generates a link to the demo session on the demo device. At block 920, the demo device sends/posts the link to an identified destination (e.g., a specified sharing channel). At block 925, the demo device receives a connection from a third party user device in response to the third party accessing the link. The connection may be a direct connection or an indirect connection that is routed through a demo server.

At block 930, the demo device streams a display output of the demo device to the demo server or to the user device. In one embodiment, the demo server forwards the stream to the connected user device. At block 935, the demo device determines whether a command has been received from the demo server or from the user device. A command received from the demo server may have been generated by the user device, and sent to the demo server by the user device. If a command is received, the method continues to block 940. If no command is received, the method continues to block 945.

At block 940, the demo device performs an action based on the received command. The action is performed as though the command had originated from the demo device (e.g., in response to user interaction with the demo device). At block 945, the demo device determines whether the connection has been terminated. The connection may be terminated by any of the demo device, the demo server or the user device. If the connection has been terminated, the method ends. If the connection has not been terminated, the method returns to block 930.

Figure 10:
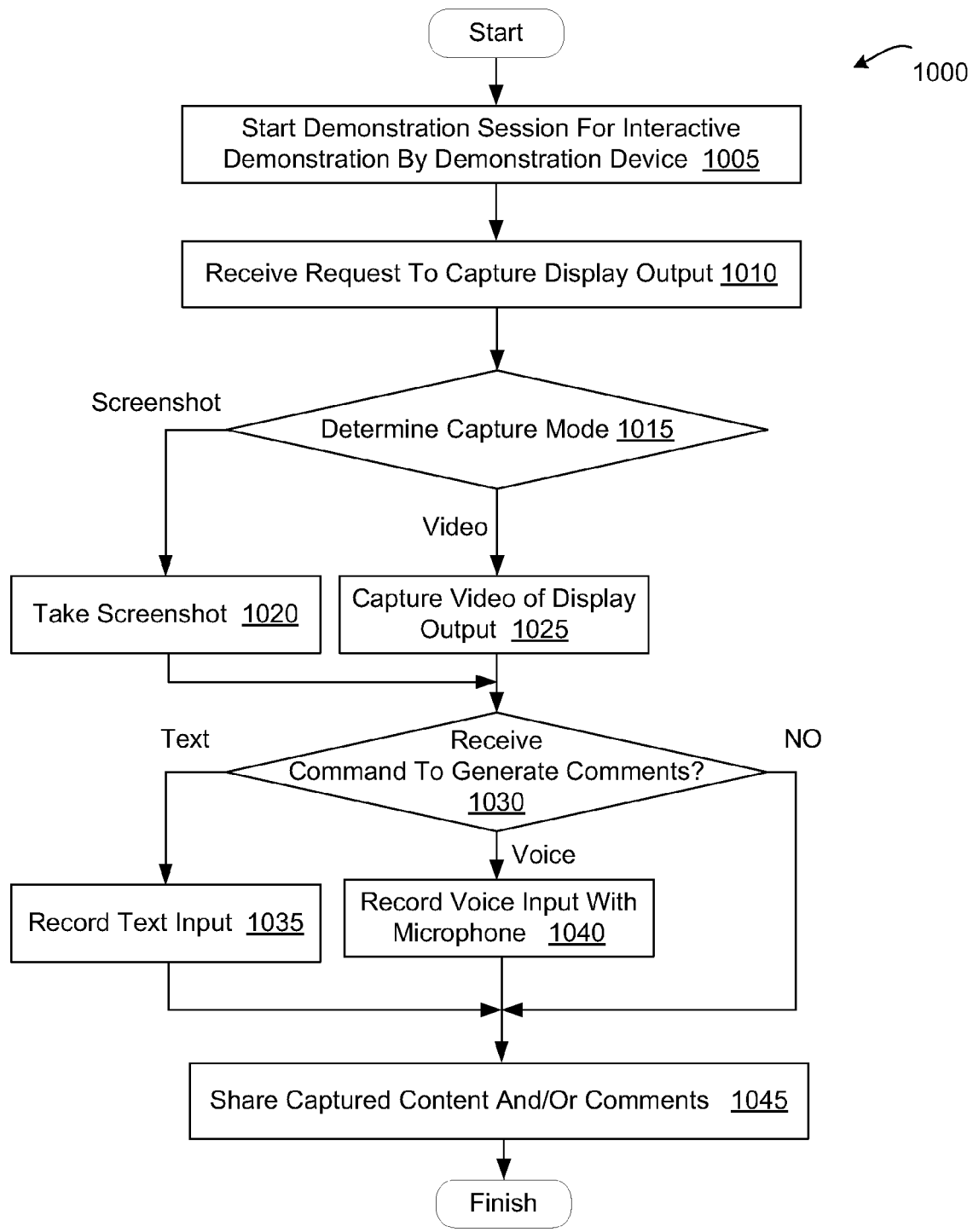
FIG. 10 is a flow diagram illustrating still another embodiment for a method of sharing an interactive demonstration by a demonstration device.

FIG. 10 is a flow diagram illustrating still another embodiment for a method of sharing an interactive demonstration by a demonstration device. The method 1000 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 1000 is performed by demonstration module 205 executed by a demonstration device 200, as shown in FIG. 2.

Referring to FIG. 10, at block 1005, a demo device starts a demonstration session for an interactive demonstration. At block 1010, the demo device receives a command to capture a display output. At block 1015, the demo device determines whether the command is to generate a screenshot or to capture a video of the display output. If the command is to generate a screenshot, the method proceeds to block 1020 and a screenshot is generated. If the command is to capture a video, the method continues to block 1025 and a video is generated of the display output. The display output may be captured until a subsequent command to stop recording is received.

At block 1030, the demo device receives a command to generate comments. The comments may be standalone text or voice comments, or may be text or voice comments attached to a screenshot or video. If at block 1030 a command to generate text comments is received, then the method continues to block 1035 and a text input is recorded. If a command to generate voice comments is received, the method continues to block 1040 and the demo device records a voice input with a microphone included in the demo device. If no command to generate comments is received, the method continues to block 1045.

At block 1045, the user device shares the captured content and/or comments. Sharing may be performed as described with reference to method 800.

Figure 11:
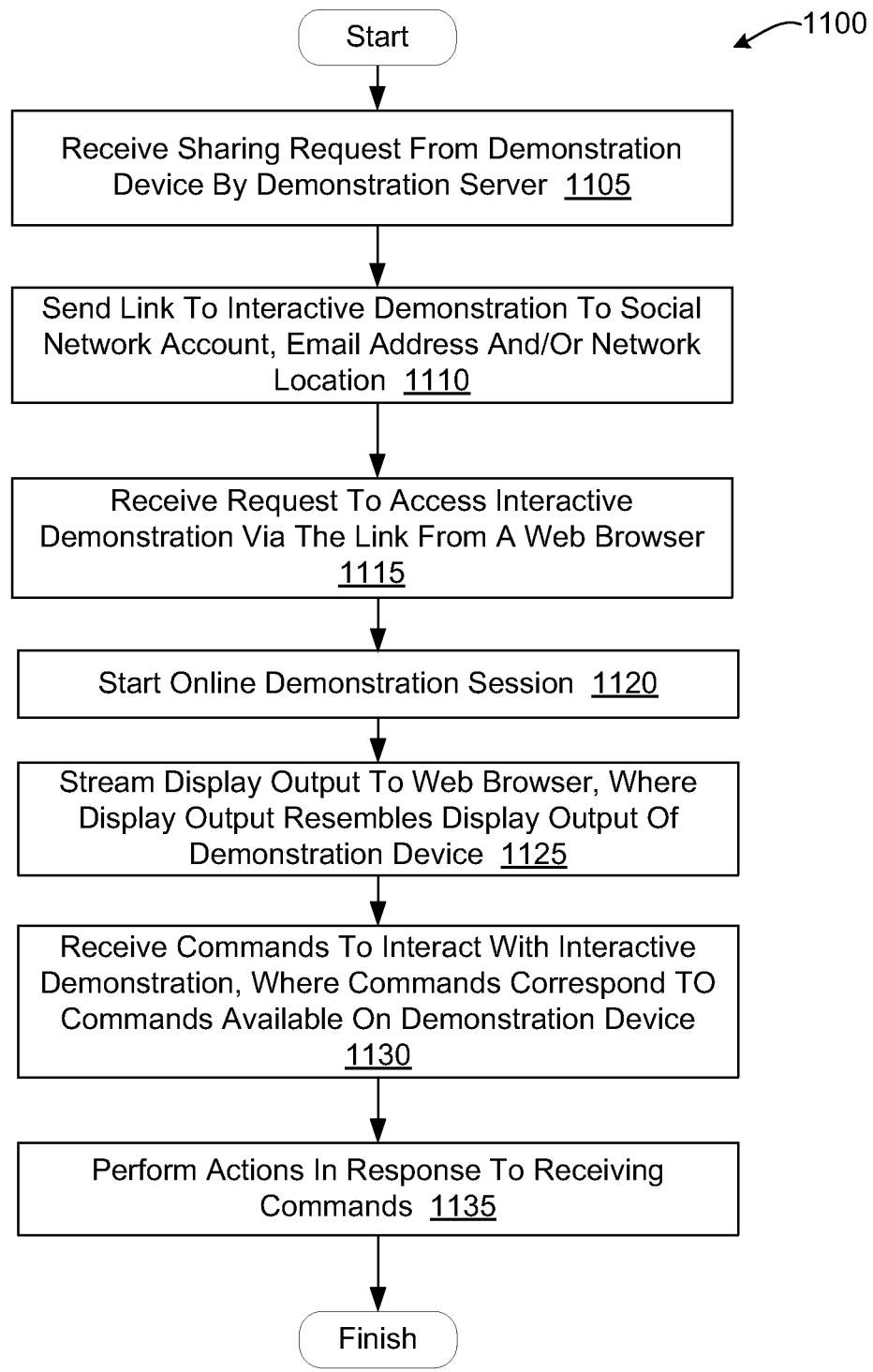
FIG. 11 is a flow diagram illustrating one embodiment for a method of providing an online interactive demonstration.

FIG. 11 is a flow diagram illustrating one embodiment for a method 1100 of providing an online interactive demonstration. The method 1100 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 1100 is performed by one or more demonstration servers, such as demo management server 305 and/or demo content server 310 as shown in FIG. 3.

Referring to FIG. 11, at block 1105, a demo server receives a sharing request from a demo device. At block 1110, the demo server generates a link to an interactive demonstration and sends the link to a sharing channel (e.g., a social network account, email address or other network location). At block 1115, the demo server receives a request to access the interactive demo via the link. The request may be received from a web browser executing on a user device. Alternatively, the request may be received from some other platform independent application running on a user device. For example, the request may be received from an application executing within a java virtual machine.

At block 1120, the demo server starts an online demo session. In one embodiment, the demo server starts a virtual demo device and causes the virtual demo device to execute the online demo session. At block 1125, the demo server streams a display output to the web browser (or other application running on the user device). The display output resembles a display output of a physical demonstration device.

At block 1130, the demo server receives commands to interact with the interactive demonstration. The commands correspond to commands that are available on a corresponding physical demo device. Examples of such commands include commands to open a digital media item (e.g., an ebook), commands to change a page, commands to access an online content store and download content, commands to share in interactive demonstration, commands to record a user review, and so on. The commands may be entered by the user based on user interaction with the web browser or other application. At block 1135, the demo server performs one or more actions in response to receiving the commands. Thus, users may experience the same interactive demonstration experience that they could experience on a physical demo device in a retail store.

Figure 12:
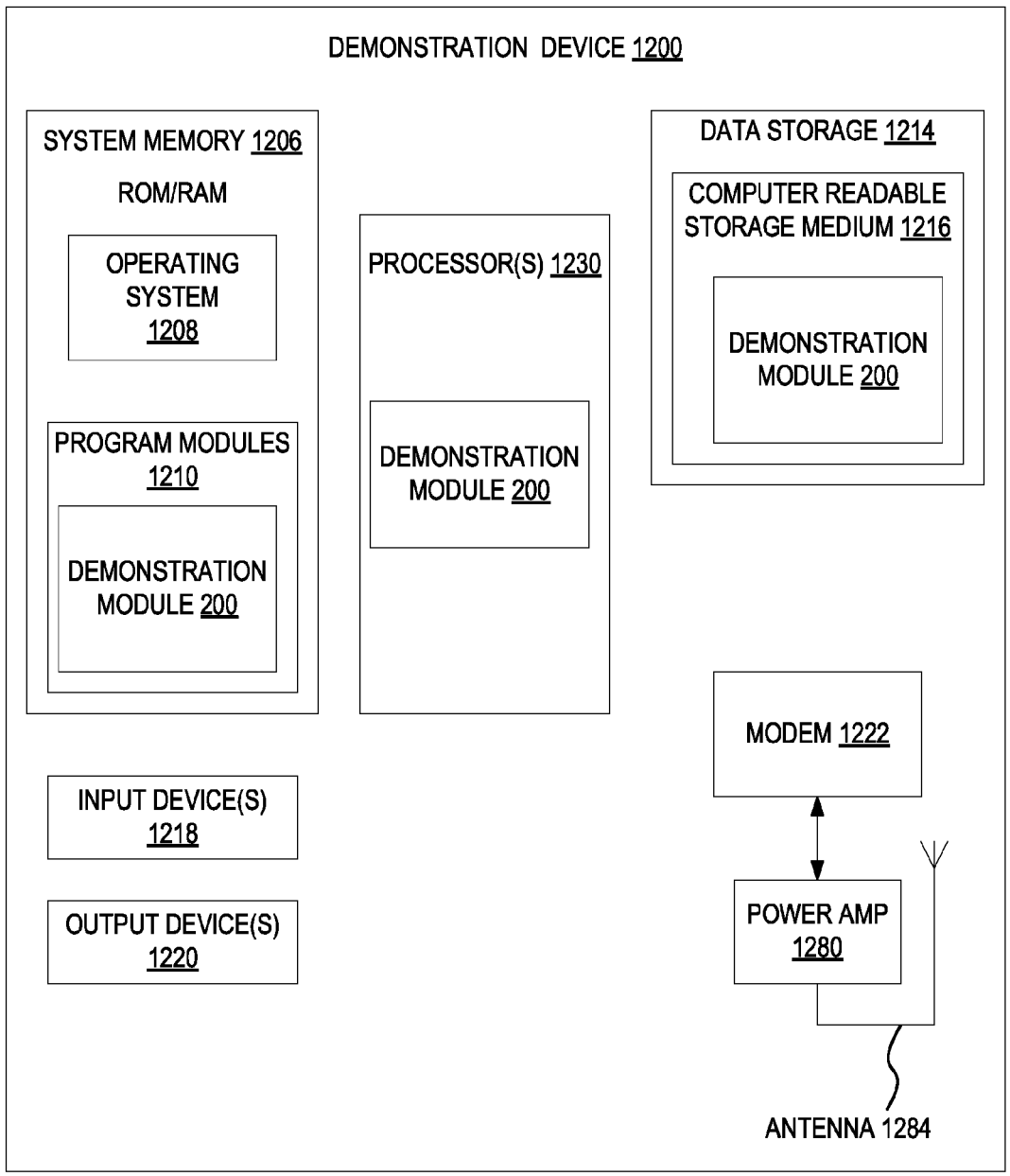
FIG. 12 is a block diagram of a demonstration device, in accordance with one embodiment of the present invention.

FIG. 12 is a block diagram illustrating an exemplary demonstration device 1200, in accordance with one embodiment of the present invention. In one embodiment, the demo device 1200 may correspond to one or all of the demo devices 105 of FIG. 1 and may be any type of demo device such as an electronic book reader, a PDA, a mobile phone, a laptop computer, a portable media player, a tablet computer, an electronic pad, a camera, a video camera, and the like.

The demo device 1200 includes one or more processors 1230, such as one or more CPUs, microcontrollers, field programmable gate arrays, or other types of processors. The demo device 1200 also includes system memory 1206, which may correspond to any combination of volatile and/or non-volatile storage mechanisms. The system memory 1206 stores information which provides an operating system component 1208, various program modules 1210 such as demonstration module 200, and/or other components. The demo device 1200 performs functions by using the processor(s) 1230 to execute instructions provided by the system memory 1206.

The demo device 1200 also includes a data storage device 1214 that may be composed of one or more types of removable storage and/or one or more types of non-removable storage. The data storage device 1214 includes a computer-readable storage medium 1216 on which is stored one or more sets of instructions embodying any one or more of the methodologies or functions described herein. As shown, instructions for the demonstration module 200 may reside, completely or at least partially, within the computer readable storage medium 1216, system memory 1206 and/or within the processor(s) 1230 during execution thereof by the demo device 1200, the system memory 1206 and the processor(s) 1230 also constituting computer-readable media. In one embodiment, data storage 1214 includes data store 242 of FIG. 2. The demo device 1200 may also include one or more input devices 1218 (keyboard, mouse device, specialized selection keys, etc.) and one or more output devices 1220 (displays, printers, audio output mechanisms, etc.).

The demo device 1200 further includes a wireless modem 1222 to allow the demo device 1200 to communicate via a wireless network (e.g., such as provided by the wireless communication system) and/or with other computing devices, such as remote computers, the item providing system, online book stores, electronic catalogs for libraries, and so forth. The wireless modem 1222 may allow the demo device 1200 to handle both voice and non-voice communications (such as communications for text messages, multimedia messages, media downloads, web browsing, etc.) with a wireless communication system. The wireless modem 1222 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 1222 may generate signals and send these signals to power amplifier (amp) 1280 for amplification, after which they are wirelessly transmitted via antenna 1284. In addition to sending data, antenna 1284 also receives data, which is sent to wireless modem 1222 and transferred to processor(s) 1230.

Figure 13:
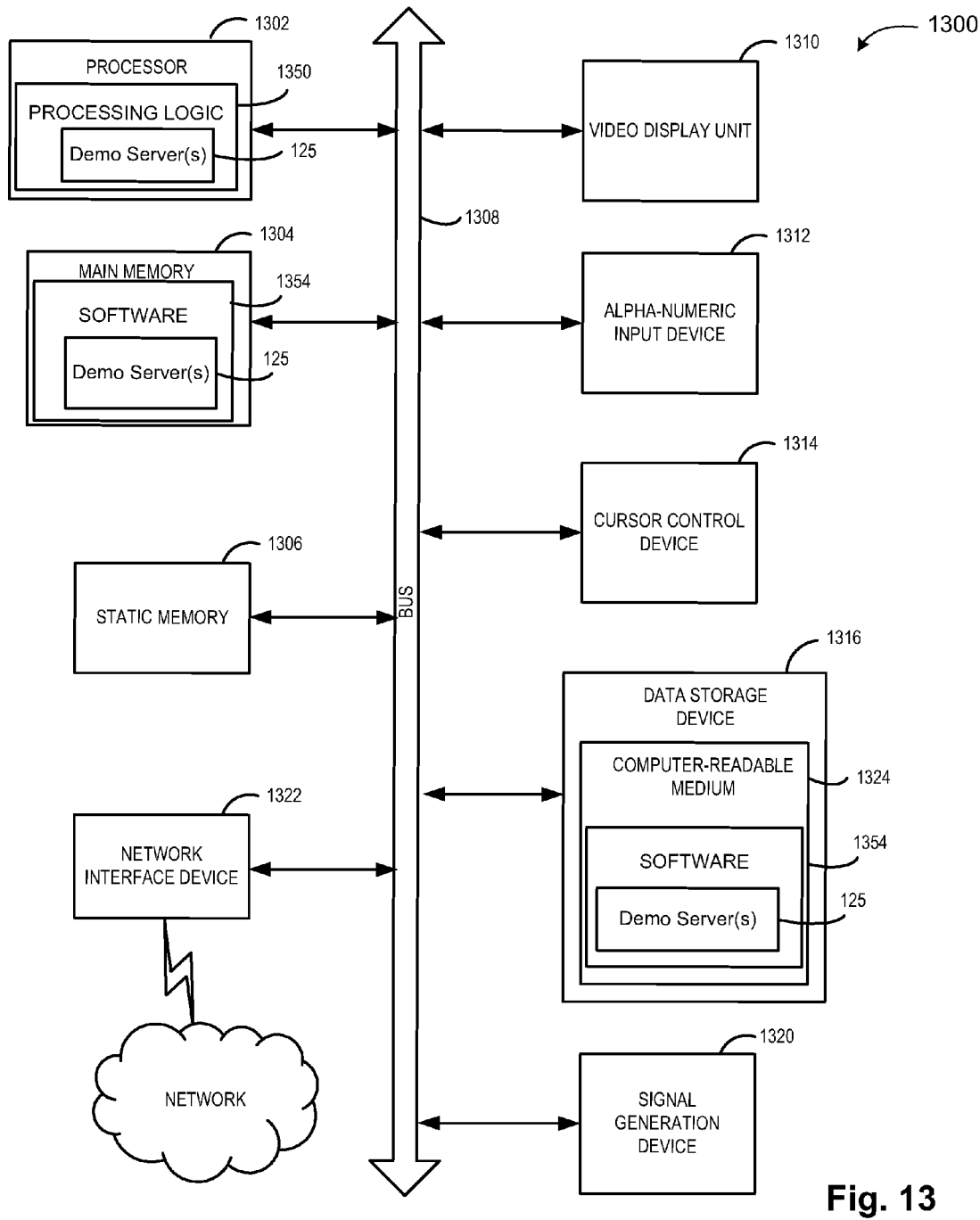
FIG. 13 is a block diagram of a computer system, in accordance with one embodiment of the present invention.

FIG. 13 illustrates a diagrammatic representation of a machine in the exemplary form of a computer system 1300 within which a set of instructions, for causing the machine to perform any one or more of the methodologies discussed herein with reference to a demonstration system and/or demonstration server, may be executed. The machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may include a personal computer (PC), a web appliance, a server machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1300 includes a processor 1302, a main memory 1304 (e.g., read-only memory (ROM), flash memory, dynamic random access memory (DRAM) (such as synchronous DRAM (SDRAM) or Rambus DRAM (RDRAM), etc.), a static memory 1306 (e.g., flash memory, static random access memory (SRAM), etc.), and a data storage device 1316, which communicate with each other via a bus 1308.

Processor 1302 represents one or more general-purpose processors such as a microprocessor, central processing unit, or the like. More particularly, the processor may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processor 1302 may also be one or more special-purpose processors such as an application specific integrated circuit (ASIC), a field programmable gate array (FPGA), a digital signal processor (DSP), network processor, or the like. The processor 1302 is configured to execute processing logic 1350 for performing the operations and steps discussed herein (e.g., for demo servers 125).

The computer system 1300 may further include a network interface device 408. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

The data storage device 1316 may include a computer-readable storage medium 1324 on which is stored one or more set of instructions (e.g., software 1354) embodying any one or more of the methodologies of functions described herein. For example, software 1354 may store instructions for a demo server 125, such as a demo management server and/or a demo content server. The software 1354 may also reside, completely or at least partially, within the main memory 1304 and/or within the processor 1302 during execution thereof by the computer system 1300; the main memory 1304 and the processor 1302 also constituting machine-accessible storage media. The software 1354 may further be transmitted or received over a network via the network interface device 1322.

While the computer-readable storage medium 1324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present invention. The term "computer-readable storage medium" shall accordingly be taken to include, but not be limited to, solid-state memories, and optical and magnetic media.

Embodiments of the present invention include various operations described herein. These operations may be performed by hardware components, software, firmware, or a combination thereof. Certain embodiments may be implemented as a computer program product that may include instructions stored on a machine-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:

providing, in a demonstration session, an interactive demonstration to a user by a physical demonstration device, wherein the physical demonstration device is a version of a consumer device that demonstrates functionality of the consumer device;

receiving a request to share the interactive demonstration along with an identification of at least one of a social network account, an email address or a web site from the user by the physical demonstration device; and responsive to the request, sharing, by the physical demonstration device, the interactive demonstration by causing a link to the interactive demonstration to be sent to at least one of the social network account, the email address or the web site;

wherein the link is to a virtual demonstration device that emulates the physical demonstration device, wherein the virtual demonstration device provides an online version of the interactive demonstration that is accessible by a remote computing device, and wherein the demonstration session started on the physical demonstration device is continuable on the virtual demonstration device based on use of the link to access the demonstration session.

2. The method of claim 1, further comprising:

receiving credentials for the social network account based on user interaction with the physical demonstration device; and using the credentials to post the link to the interactive demonstration onto at least one of the social network account or an associated social network account.

3. The method of claim 1, further comprising:

causing an additional link to the interactive demonstration to be sent to at least one of the social network account, the email address or the web site, wherein the additional link is for a remote interface to the demonstration session on the physical demonstration device; and streaming a display output of the physical demonstration device to a demonstration server, wherein the display output is receivable by a user device via the additional link.

4. The method of claim 3, further comprising:

receiving a command from the demonstration server, wherein the command was sent to the demonstration server by the user device; and performing an action on the physical demonstration device based on the command as though the command had originated from the physical demonstration device based on user interaction with the physical demonstration device.

5. The method of claim 1, further comprising:

capturing a display output of the physical demonstration device, wherein capturing the display output comprises generating at least one of a screenshot or a video of the display output; and sharing the captured display output by causing the captured display output or a link to the captured display output to be sent to at least one of the social network account, the email address or the web site.

6. The method of claim 1, further comprising:

recording a comment of the user by the physical demonstration device, wherein the comment comprises at least one of a voice comment or a text comment; and sharing the comment by causing the comment or a link to the comment to be sent to at least one of the social network account, the email address or the web site.

7. A method comprising:
receiving, by a computing device executing a demonstration server, a command to share an interactive demonstration with at least one of a social network account, an email address or a web site from a physical demonstration device, wherein the physical demonstration device is a version of a consumer device that demonstrates functionality of the consumer device, the interactive demonstration comprising a demonstration session that was started on the physical demonstration device;
responsive to the command, sending, to at least one of the social network account, the email address or the web site, a link to the interactive demonstration;
receiving, by the computing device, a request to access the interactive demonstration via the link from a remote computing device; and
continuing the demonstration session based on sending, from the computing device to the remote computing device, data for the demonstration session, wherein the demonstration session comprises demonstration content and device settings of a virtual demonstration device that emulates the physical demonstration device.

8. The method of claim 7, wherein sending the data to the remote computing device comprises:
streaming a first display output to the remote computing device, wherein the first display output resembles a second display output of the physical demonstration device;
receiving commands to interact with the interactive demonstration, wherein each of the commands corresponds to a command available on the physical demonstration device; and
performing actions in response to the commands, wherein the actions correspond to actions of the physical demonstration device.

9. The method of claim 7, further comprising:
receiving an additional request to share the interactive demonstration from the remote computing device, the additional request comprising at least one of an additional social network account, an additional email address or an additional web site; and
sending, to at least one of the additional social network account, the additional email address or the additional web site, an additional link to the interactive demonstration.

10. The method of claim 7, further comprising:
receiving a review that was generated by the physical demonstration device based on user input with the physical demonstration device, the review comprising at least one of a screen shot, a recorded video, a text comment or a voice comment;
generating a link to the review; and
sharing the review by sending the link to the review to at least one of an additional social network account, an additional email address or an additional web site.

11. The method of claim 7, wherein providing the interactive demonstration to the remote computing device comprises:
starting the virtual demonstration device;
assigning the virtual demonstration device to the remote computing device; and
streaming information to the remote computing device to enable the remote computing device to control the virtual demonstration device.

12. The method of claim 7, further comprising:
establishing a connection between the remote computing device and the physical demonstration device executing the interactive demonstration.

13. A physical demonstration device comprising:
a memory; and
a processor coupled to the memory, wherein the physical demonstration device is a version of a consumer device that demonstrates functionality of the consumer device, and wherein the processor is configured to:
provide, in a demonstration session, an interactive demonstration to a user;
receive a request to share the interactive demonstration along with an identification of at least one of a social network account, an email address or a web site from the user; and
responsive to the request, share the interactive demonstration by causing a link to the interactive demonstration to be sent to at least one of the social network account, the email address or the web site;
wherein the link is to a virtual demonstration device that emulates the physical demonstration device, wherein the virtual demonstration device provides an online version of the interactive demonstration that is accessible by a remote computing device, and wherein the demonstration session started on the physical demonstration device is continuable on the virtual demonstration device based on use of the link to access the demonstration session.

14. The physical demonstration device of claim 13, wherein the processor is further configured to:
receive credentials for accessing the social network account; and
post the link to the interactive demonstration onto at least one of the social network account or an associated social network account using the credentials.

15. The physical demonstration device of claim 13, wherein the processor is further configured to:
cause an additional link to the interactive demonstration to be sent to at least one of the social network account, the email address or the web site, wherein the additional link is for a remote interface to the demonstration session on the physical demonstration device; and
stream a display output of the physical demonstration device to a demonstration server, wherein the display output is receivable by a user device via the additional link.

16. The physical demonstration device of claim 15, wherein the processor is further configured to:
receive a command from the demonstration server, wherein the command was sent to the demonstration server by the user device; and
perform an action on the physical demonstration device based on the command as though the command had originated from the physical demonstration device based on user interaction with the physical demonstration device.

17. The physical demonstration device of claim 13, wherein the processor is further configured to:
capture a display output of the physical demonstration device, wherein capturing the display output comprises generating at least one of a screenshot or a video of the display output; and
share the captured display output by causing the captured display output or a link to the captured display output to be sent to at least one of the social network account, the email address or the web site.

18. The physical demonstration device of claim 13, wherein the processor is further configured to:

record a comment of the user, wherein the comment comprises at least one of a voice comment or a text comment; and share the comment by causing the comment or a link to the comment to be sent to at least one of the social network account, the email address or the web site.

19. A demonstration system comprising:
a memory to store instructions for a demonstration server; and
a processor, coupled to the memory, wherein the processor is configured by the instructions to:
receive, from a physical demonstration device, a command to share an interactive demonstration along with a designation of a communication channel to use to share the interactive demonstration, the communication channel comprising one of a social network account, an email address or a web site, wherein the physical demonstration device is a version of a consumer device that demonstrates functionality of the consumer device, the interactive demonstration comprising a demonstration session that was started on the physical demonstration device;
responsive to the command, use the communication channel to share a link to the interactive demonstration;
receive a request to access the interactive demonstration via the link from a remote computing device; and
continue the demonstration session based on sending, to the remote computing device, data for the demonstration session.

20. The demonstration system of claim 19, wherein sending the data to the remote computing device comprises:
streaming a first display output to the remote computing device, wherein the first display output resembles a second display output of the physical demonstration device;
receiving commands to interact with the interactive demonstration, wherein each of the commands corresponds to a command available on the physical demonstration device; and
performing actions in response to the commands, wherein the actions correspond to actions of the physical demonstration device.

21. The demonstration system of claim 19, wherein the processor is further configured to:
receive a review that was generated by the physical demonstration device based on user input with the physical demonstration device, the review comprising at least one of a screen shot, a recorded video, a text comment or a voice comment;
generate a link to the review; and
share the review by sending the link to the review to at least one of the social network account, the email address or the web site.

22. The demonstration system of claim 19, wherein the processor is further configured to:
start a virtual demonstration device;
load the demonstration session on the virtual demonstration device; and
enable the remote computing device to control the virtual demonstration device.

23. The demonstration system of claim 19, wherein the processor is further configured to:
establish a connection between the remote computing device and the physical demonstration device executing the interactive demonstration.

24. A non-transitory computer readable storage medium including instructions that, when executed by a processor of a physical demonstration device, cause the physical demonstration device to perform a method comprising:
providing, in a demonstration session, an interactive demonstration to a user by the processor of the physical demonstration device, wherein the physical demonstration device is a version of a consumer device that demonstrates functionality of the consumer device;
receiving a request to share the interactive demonstration along with an identification of at least one of a social network account, an email address or a web site from the user by the processor; and
responsive to the request, sharing, by the processor, the interactive demonstration by causing a link to the interactive demonstration to be sent to at least one of the social network account, the email address or the web site;
wherein the link is to a virtual demonstration device that emulates the physical demonstration device, wherein the virtual demonstration device provides an online version of the interactive demonstration that is accessible by a remote computing device, and wherein the demonstration session started on the physical demonstration device is continuable on the virtual demonstration device based on use of the link to access the demonstration session.

25. The non-transitory computer readable storage medium of claim 24, the method further comprising:
receiving credentials for the social network account; and
posting the link to the interactive demonstration onto at least one of the social network account or an associated social network account based on the credentials.

26. The non-transitory computer readable storage medium of claim 24, the method further comprising:
causing an additional link to the interactive demonstration to be sent to at least one of the social network account, the email address or the web site, wherein the additional link is for a remote interface to the demonstration session on the physical demonstration device; and
streaming a display output of the physical demonstration device to a demonstration server, wherein the display output is receivable by a user device via the additional link.

27. The non-transitory computer readable storage medium of claim 26, the method further comprising:
receiving a command from the demonstration server, wherein the command was sent to the demonstration server by the user device; and
performing an action on the physical demonstration device based on the command as though the command had originated from the physical demonstration device based on user interaction with the physical demonstration device.

28. The non-transitory computer readable storage medium of claim 24, the method further comprising:
generating a user review based on user input, wherein generating the user review comprises at least one of generating a screenshot of a display output of the physical demonstration device, generating a video of the display output, recording a voice comment or recording a text comment; and
sharing the user review by causing the user review or a link to the user review to be sent to at least one of the social network account, the email address or the web site.

29. A non-transitory computer readable storage medium including instructions that, when executed by a processor, cause the processor to perform a method comprising:

receiving, by the processor, a command to share an interactive demonstration with at least one of a social network account, an email address or a web site from a physical demonstration device, wherein the physical demonstration device is a version of a consumer device that demonstrates functionality of the consumer device, the interactive demonstration comprising a demonstration session that was started on the physical demonstration device;

sending, to at least one of the social network account, the email address or the web site, a link to the interactive demonstration;

receiving, by the processor, a request to access the interactive demonstration via the link from a remote computing device; and continuing the demonstration session based on sending, from the processor to the remote computing device, data for the demonstration session.

30. The non-transitory computer readable storage medium of claim 29, wherein sending the data to the remote computing device comprises:

streaming a first display output to the remote computing device, wherein the first display output resembles a second display output of the physical demonstration device;

receiving commands to interact with the interactive demonstration, wherein each of the commands corresponds to a command available on the physical demonstration device; and performing actions in response to the commands, wherein the actions correspond to actions of the physical demonstration device.

31. The non-transitory computer readable storage medium of claim 29, the method further comprising:

receiving a review that was generated by the physical demonstration device based on user input with the physical demonstration device, the review comprising at least one of a screen shot, a recorded video, a text comment or a voice comment;

generating a link to the review; and sharing the review by sending the link to the review to at least one of the social network account, the email address or the web site.

32. The non-transitory computer readable storage medium of claim 29, wherein providing the interactive demonstration to the remote computing device comprises:

starting a virtual demonstration device that emulates the physical demonstration device; and enabling the remote computing device to control the virtual demonstration device.

\* \* \* \* \*